US007561876B2

(12) United States Patent
Chiou et al.

(10) Patent No.: US 7,561,876 B2
(45) Date of Patent: Jul. 14, 2009

(54) SYSTEM WITH USER INTERFACE FOR NETWORK PLANNING AND MOBILITY MANAGEMENT OPTIMIZATION IN A MOBILE COMMUNICATION NETWORK AND METHOD THEREOF

(75) Inventors: Ta-gang Chiou, Taipei (TW); Chun-chih Yeh, Taipei (TW); Zi-jing Juang, Taipei (TW); Ming-hui Young, Taipei (TW)

(73) Assignee: Groundhog Technologies Inc., Cambridge ( * ) Notice: Subject to any disclaimer, the term of this patent is extended or adjusted under 35 U.S.C. 154(b) by 997 days.

(21) Appl. No.: 10/981,615

(22) Filed: Nov. 5, 2004

(65) Prior Publication Data
US 2005/0097161 A1 May 5, 2005

Related U.S. Application Data

(63) Continuation-in-part of application No. 10/369,678, filed on Feb. 21, 2003, now abandoned.

(60) Provisional application No. 60/601,618, filed on Aug. 16, 2004, provisional application No. 60/517,861, filed on Nov. 7, 2003.

(51) Int. Cl.
*H04Q 7/20* (2006.01)
(52) U.S. Cl. ............. 455/423; 455/466; 455/422.1; 455/424; 455/418
(58) Field of Classification Search ............ 455/418, 455/453, 446, 423, 424, 422.1; 715/733–736
See application file for complete search history.

(56) References Cited

U.S. PATENT DOCUMENTS

| | | | | |
|---|---|---|---|---|
| 5,561,841 A | * | 10/1996 | Markus | 455/446 |
| 6,456,845 B1 | * | 9/2002 | Drum et al. | 455/424 |
| 6,539,221 B1 | * | 3/2003 | Vasudevan et al. | 455/423 |
| 7,142,868 B1 | * | 11/2006 | Broyles et al. | 455/446 |
| 2003/0125020 A1 | * | 7/2003 | Sauriol et al. | 455/425 |
| 2008/0109731 A1 | * | 5/2008 | Chang et al. | 715/736 |

OTHER PUBLICATIONS

Vinvent W. S. Wong and Victor C.M. Leung, "Location Management for Next-Generation Personal Comnication Networks", IEEE Network, Sep./Oct. 2000.

(Continued)

*Primary Examiner*—Kamran Afshar

(57) ABSTRACT

A system and method for performing a network planning and mobility management optimization is provided, and it includes a graphical user interface (GUI) front-end for allowing users to operate required procedures for network planning and mobility management optimization. According to this invention, the network plan takes a network topology (NT) and its associated network statistic data as input. Accordingly, a network plan can represent an arrangement of network elements which display a superior-subordinate relationship between network elements in the mobile communication network. Moreover, the network plan comprises a plurality of statistic data reflecting a plurality of user mobility behaviors and a plurality of traffic behaviors of network elements in the mobile communication network. Moreover, network elements, links and their related statistics data can be presented on the GUI window, and then users can analyze traffic conditions and the planning result to determine an optimal plan which meets the optimization level required.

37 Claims, 10 Drawing Sheets

OTHER PUBLICATIONS

C.M. Fiduccia and R.M. Matteyses, "A Linear-Time Heuristic for Improving Network Partitions", Proc. of Design Automation Conference, 1982.

Ilker Demirkol, Cem Ersoy, M. Ufuk Caglayan, and Hakan Delic, "Location Area Planning in Cellular Networks Using Simulated Annealing", Proceedings of IEEE Infocom, 2001.

B.W. Kernighan and S. Lin, "An Efficient Heuristic Procedure for Partitioning Graphs", The Bell System Technical Journal, Feb. 1970.

Wenye Wang, Ian F. Akyildiz, Gordon L. Stuber, "An Optimal Partition Algorithm for Minimization of Paging Costs", IEEE, 2000.

* cited by examiner

System Architecture

SYSTEM WITH USER INTERFACE FOR NETWORK PLANNING AND MOBILITY MANAGEMENT OPTIMIZATION IN A MOBILE COMMUNICATION NETWORK AND METHOD THEREOF

CROSS REFERENCE TO OTHER APPLICATIONS

This application claims the benefit of U.S. Provisional Patent Application, Ser. No. 60/517,861, entitled "System and User Interface for Network Planning, Mobility Management, and Mobility Management Optimization In A Wireless Communication System" filed on Nov. 07, 2003, and U.S. Provisional Patent Application, Ser. No. 60/601,618, entitled "User Interface of Mobility Management Optimization In 3D with features such as dot size representing mobility volume, etc" filed on Aug. 16, 2004 are incorporated by reference herein.

This application is a continuation-in-part of application, "SYSTEM FOR CONSTRUCTING A MOBILITY MODEL FOR USE IN MOBILITY MANAGEMENT IN A WIRELESS COMMUNICATION SYSTEM AND METHOD THEREOF", Ser. No. 10/369,678, filed on Feb. 21, 2003, published. No. US-2004-0165561-A1, published on Aug. 26, 2004 is hereby incorporated the content of this application by reference.

FIELD OF THE INVENTION

The invention relates generally to a user interface and more particularly, a system for performing a network planning and mobility management optimization in a mobile communication network through a graphic user interface (GUI).

BACKGROUND OF THE INVENTION

The freedom and convenience afforded by mobile systems have made them very popular, mobile communication networks must be developed or modified rapidly in order to satisfy the growth of mobile network traffic. Therefore, it has created a demand for mobile communication networks that can provide subscribers better quality of service and have no influence by increasing traffic.

FIG. 1 shows the rough illustration of a sample mobile communication network. Taking the cellular system as an example, the geographical coverage area of the mobile communication network is partitioned into cells served by base stations 100. Each mobile station of an individual subscriber is connected to the wireless network via the base stations. The coverage of cells differs greatly according to various factors, such as the power of the base station, the geographical features (e.g. mountains, valleys or rivers) within the cells, the area (e.g. city or suburb) of the cells and the architecture (e.g. tall buildings, railroad or highway) within the cells, etc. One or more cells are respectively combined to a location area 110 (LA) in a GSM system, also known as Paging Area (PA), Routing Area (RA) or Registration Area in other systems. Basically, a location area is a region in which subscribers can move arbitrarily without a location area update (LU) that incurs the central database update (e.g. in a Home Location Register (HLR) or Visitor Location Register (VLR)) of the location area information that is utilized for describing the current location area of subscribers. The size of a location area is defined to cover the demands raised by traffic density and flow, population density and subscriber mobility, etc.

Mobility management enables the wireless network to find the locations of mobile stations so as to deliver incoming calls, messages or packets to mobile stations. Mobility management includes location update, paging and other operations, such as handover, etc., which are related to the location or mobility of subscribers. Since subscribers are free to move within the service area of the system, the system can only maintain the approximate location of each subscriber. When a connection needs to be established for a particular subscriber, the system has to determine the subscriber's exact location, to the accuracy of a cell, within the location area. When a subscriber crosses the border of the specific location area, the mobile station must register its new location area through signaling the location area information to the system. This procedure is called location area updating (LU) or location registration. The updating procedure is for informing the system about the current location area of the subscriber. Besides location area update, there are also other types of location updates that will be described later in this specification. When the system tries to deliver a phone call or message to a subscriber by first finding the location of the specific subscriber, the system can search among the cells within the current location area of the mobile station. This procedure is called paging. The paging procedure is for determining the exact location, to the accuracy of a cell, of the subscriber.

Because there are many tradeoffs and complexity involved, the parameters employed in mobility management are difficult to be defined in an optimal manner. For example, how to define the scope, including the size and the border, of location areas so as to decrease the overall traffic loads of the mobile communication network is an important issue for optimizing mobility management. Since a location area is composed of cells, the size and the border of each location area can be defined by deciding which cells are collected into the location area. If the size of the location area is too small, mobile stations cross the border of the location area frequently. As a result, the mobile stations perform location area updates frequently. The system can thus have lower paging loads. However, the system must waste its resources by performing frequently location area updates, and the mobile station must waste its power to transmit the location area update signal. Alternatively, if the size of the location area is too large, mobile stations cross the border of the location area rarely and do not perform location area updates frequently. However, a large coverage area has to be paged when a call or a message arrives, and thereby the resources of the system are wasted. In addition, the border of the location area is also an important factor in defining the scope of the location area. If the border of the location area is set parallel to and close to major highways, or in heavy traffic regions where population and mobility behavior of the subscribers are heavy loads, the mobile stations may result in many location area updates. Furthermore, the subscribers may cross the border of a specific location area back and forth, thereby causing many location area updates, if the border of the location area is not properly set. As a result, the system wastes its resources by processing frequent location area update procedures, and the mobile stations waste power transmitting the location area update signal.

Various conventional mobility models, such as fluid flow model, gravity mode and random walk model, etc., are presented as a basis for studying issues resulting from subscribers' behavior. For further discussions, please refer to "Location Management for Next-Generation Personal Communications Networks" (pp. 18~pp.24, IEEE Network, September/October 2000) incorporated herein by reference. Those conventional mobility models most likely are used to study issues for subscribers' behavior, as mentioned, not for the purpose of mobility management optimization in a live mobile communication network so that they are deficient in precision and accuracy to practically optimize a mobility management. Moreover, the methods and models described above don't provide suitable and user-friendly software for users, basically, the user interface thereof is merely for the purpose of engineering-background people to use. Therefore, it is desirable to provide a user interface system that is capable of enabling a user to simply and relatively quickly analyze the status of a mobile network and thereby optimize mobility management for the live mobile network.

SUMMARY OF THE INVENTION

In accordance with exemplary embodiments of the present invention, the above-identified deficiencies and drawbacks for use in analyzing the status of a mobile network and thereby optimizing mobility management for the live mobile network are overcome. The present invention provides a system and method for performing a network planning and mobility management optimization in a mobile communication network through a GUI. The application GUI window allows users to operate required procedures for network planning and mobility management optimization.

In one embodiment of the invention, an exemplary system and method can create a network plan which take a network topology (NT) and its associated network statistic data as input, wherein the NT represents the specific arrangement of network elements of a mobile communication network in the geographic area. Accordingly, a network plan can represent an arrangement of network elements which display a superior-subordinate relationship between network elements in the mobile communication network. Moreover, the network plan comprises a plurality of statistic data reflecting a plurality of user mobility behaviors and a plurality of traffic behaviors of network elements in the mobile communication network.

Network elements, links and their related statistics data can be presented on the map window of the application GUI window once the NT has been imported into the system and the sample data has been collected. Accordingly, network structure can be determined and users can analyze traffic conditions for the existing network.

A mobility model characterizes subscriber movement patterns within a mobile network. Using a mobility model that reflects realistic and reproducible user behaviors plays a key role for optimizing network performance. In one embodiment of the invention, based on the collected statistics data, a mobility model is generated to reflect the actual behavior of subscribers within the network rather than just pure mathematical simulation.

Then, users can easily perform the network planning and the mobility management optimization through a graphic user interfaces, and they can analyze the planning result to determine an optimal plan which meets customer's requirements (e.g. reducing signaling congestion, improving inter Base Station Controller (BSC)/Mobile Switching Center (MSC) handover failures, better network responsiveness, and a higher quality of service, etc.). Additionally, the reporting mechanism of the invention allows various rendering forms such as viewing on screen, printing to spreadsheets or sending the report via email.

Additional features and advantages of the invention will be set forth in the description which follows, and in part will be obvious from the description, or may be learned by the practice of the invention. These and other features of the present invention will become more fully apparent from the following description and appended claims, or may be learned by the practice of the invention as set forth hereinafter.

DETAILED DESCRIPTION OF PREFERRED EMBODIMENTS

Figure 1:
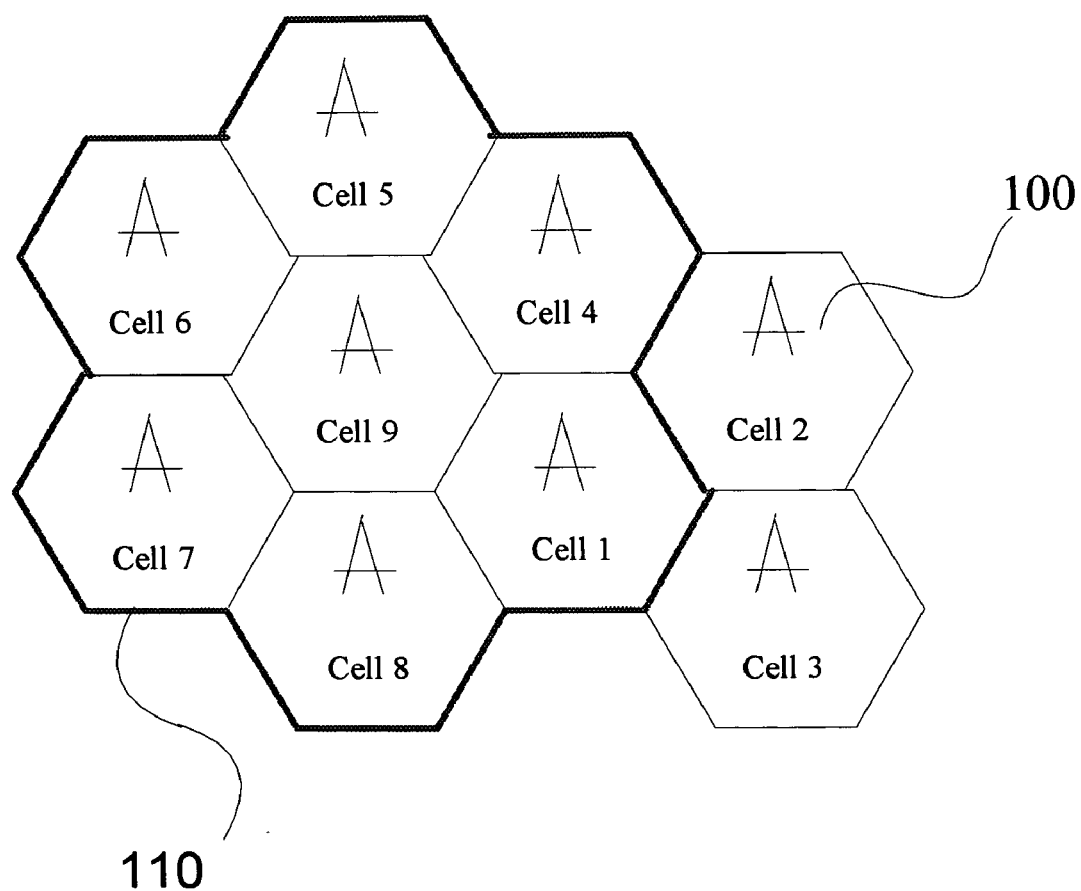
FIG. 1 illustrates a sample scheme of a mobile communication network.
Figure 2:
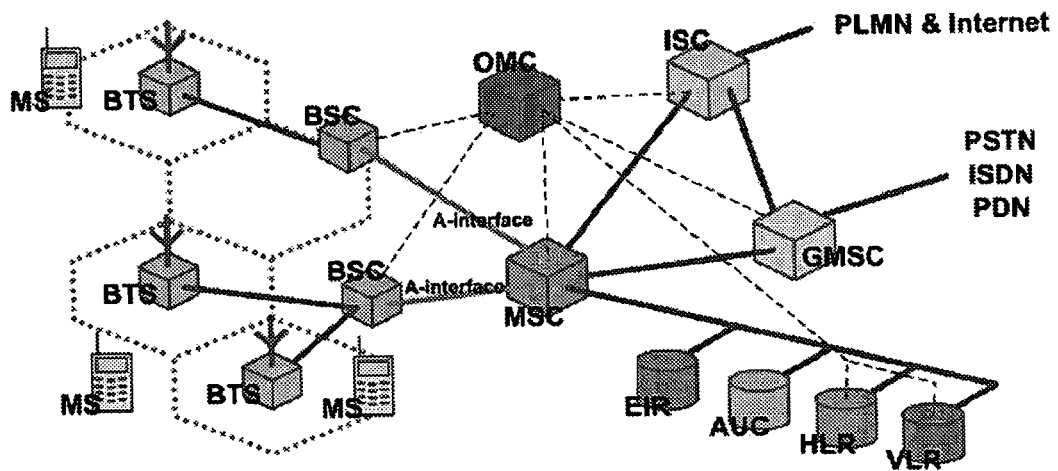
FIG. 2 illustrates the system architecture of a mobile communication network.

The system architecture of a mobile communication network is shown in FIG. 2. The basic layout of the system architecture in terms of several functional entities, whose functions and interfaces are specified, will be described as follows.

The Public Land Mobile Network (PLMN) includes the following system entities: The Mobile Station (MS) represents the terminal equipment used by the wireless subscriber in a mobile communication network. The Base Transceiver Station (BTS) is the base station serving one cell of the system. The Base Station Controller (BSC), controlling one or more Base Transceiver Stations, is responsible for communication within a location area/routing area. Operation and Maintenance Center (OMC) allows the network provider to operate, administer, and monitor the functioning of the system, and update equipment and subscriber databases. Mobile Switching Center (MSC) performs the switching functions for all mobile stations located in the geographic area covered by the mobile network. Home Location Register (HLR) contains the identities of mobile subscribers, their service parameters, and their location information. The location information is stored as a Mobile Station Roaming Number (MSRN), which is a directory number that the network can use to route calls to the MSC where the mobile subscriber is located at the time of call establishment. The Visitor Location Register (VLR) contains selected administrative information from the HLR, necessary for call control and provision of the subscribed services, for each mobile currently located in the geographical area controlled by the VLR. The Equipment Identity Register (EIR) is the database that contains a list of all valid mobile equipment on the network, where each mobile station is identified by its International Mobile Equipment Identity (IMEI). An IMEI is marked as invalid if it has been reported stolen or is not type approved. The Authentication Center (AUC) contains subscriber authentication data called Authentication Keys. The Gateway Mobile Switching Center (GMSC) integrates the MSCs in a PLMN and provides subscribers with a "gateway" to communicate with those from other PLMNs. International Switching Center (ISC) makes the "international" switching services possible and available. Besides, the A-interface (under the GSM system) is used to carry the 64 kbit/s speech data and signaling information between the BSC and the MSC. On the other hand, under other systems, this interface is run with other protocols under different names.

The mobile telecommunication system is quite complicated, and the purchase, implementation, evaluation, adjustment and tests all require a lot of efforts. The purpose of mobile network planning (or network design) is to precisely design a network with the lowest traffic loads, lowest traffic congestions and highest performance by considering the type of input of network, budget, geographical information and information of subscribers. There are some software programs designed for mobile network planning, but usually they are designed mainly for some specific purposes and are not very user-friendly.

Therefore, those user interfaces are not able to reduce the manual tedious work and reduce the learning time and costs efficiently. The conventional user interfaces may occur frequently the situation that is unable to precisely reflect the status of all network elements and links in a more user-friendly way. Also, the conventional user interfaces may not accurately reflect the real mobility behavior of subscribers for optimizing mobility management.

In the embodiment of the present invention, a new graphic user interface construction and corresponding operational methods are provided in order to easily process for network planning and mobility management optimization through a GUI. A network plan provides information about a network topology referring to the arrangements of elements within a network, and the network topology describes network elements (e.g., MSCs, BSCs, Cells, etc.), their physical and logical properties, and the relationships between and among elements (such as neighboring cells of a cell and how many and which cells belong to a specific location area). In the other side, a network plan provides information about network statistic data which reflect different aspects of subscribers' behavior in the mobile network. Further, users may observe network statistic data with texts, graphs, numbers, maps, colors, legends or numbers with direction. The mobility model constructed according to the network statistic data combines all the different aspects and metrics of subscribers' behavior, and realistically reflects the mobility behavior of the subscribers in the system.

The graphic user interfaces allow users to generate the mobility model by different time point or different time range, to select the data range and mobility management optimization deployment range, to view the results of mobility management optimization and the deployment plan which provides recommendations on how to restructure or rehome network elements to improve traffic and loads within a network planning area. In addition, the mobility model disclosed in the embodiment of the present invention needs not be set up through oversimplifying the complexity of the mobile communication network, with the graphic user interfaces containing enough functions for the user to view or to change any attributes of the real complicated communication network and see the results of changes. It can be utilized to provide an objective optimal solution to minimize the overall traffic loads of the network when reconfiguring mobility management related parameters, such as the scope of a location area, the serving area of MSC and BSC, the traffic loads, capacity constraints, etc.

The graphic user interfaces further let users modify the related parameters easily. The capital expenditure of the system operators can thus be reduced. Therefore, the embodiment of the present invention is an interactive application designed to assist in the analysis and optimization of mobile networks, and it provides a graphical front-end for analysis of traffic loads and user mobility pattern in mobile communication network. A network topology (NT) and its associated network statistic data are taken as input for a network plan and an optimized recommendation for how the network should be reconstructed into, such as location area, serving area of network controller. The term of location area is used specifically for the GSM mobile communication network. However, it is also known as Paging Area, Routing Area, or Registration Area which are used for different mobile communication networks, for example, "Location Area" is typically used in GSM communication system and "Routing Area" is typically used in GPRS communication system. In addition, "Registration Area" and "Paging Area" are generally used in many communication systems. Although their names are different, people skilled in the art know that their meanings are substantially the same, i.e., updating message are required when moving across the boundary of location area (or routing area, or registration area) and mobile stations are paged in their current location area (or routing area, or registration area). Since the GSM mobile communication network is used for an example in this embodiment, location area is used in this specification. However, the use of the present invention is not limited in the GSM mobile communication network. The term of network controller can be MSC, BSC used in GSM communication system, "SGSN (GPRS Support Node)" used in GPRS communication system, and "RNC (Radio Network Controller)" used in UMTS communication system.

Plans may be generated iteratively by using different mobility models and partitioning algorithms, compared with each other, and persisted in the database. Further, the invention's reporting mechanism allows various reports to be exported to other media, such as spreadsheets or emails.

Figure 3:
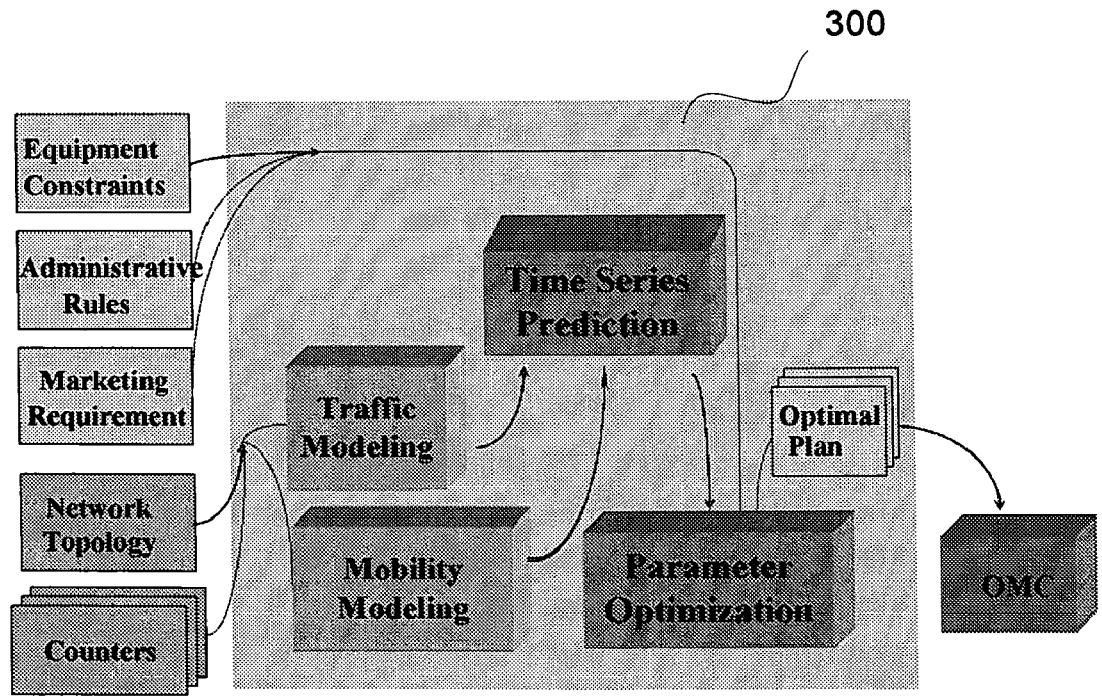
FIG. 3 illustrates a simplified functional block diagram of the system for network planning and mobility management optimization according to the preferred embodiment of the present invention.

FIG. 3 illustrates a simplified functional block diagram of the system for processing a network planning and mobility management optimization according to the embodiment of the present invention. The middle block with dark background 300 is the main functional block of the present invention including a mobility modeling mechanism, a traffic modeling mechanism, and a time-series prediction mechanism. It should be noted that the all mechanisms disclosed in FIG. 3 can be implemented by a hardware device, a software program, or a combination of a hardware device and a software program. People skilled in the art can easily know the way to implement the mechanisms of FIG. 3 according to the description of the present specification. The input of the system is on its left-hand side such as network topology, equipments constraints, etc., and the output of the system is on its right-hand side such as Operation and Maintenance Center (OMC).

There are many network statistics that can reveal only part of subscribers' mobility model, but none of them can reveal the complete status of mobility model. Based on mathematical modeling, mobility intelligence technology interweaves the data gathered from these disparate information sources to reconstruct the aggregate mobility model of subscribers, with unprecedented accuracy level. Mobility model implies knowledge such as how many subscribers move from one place to another place at different time, how it changes spatially, and how it evolves temporally, for instance, "mobility rate" indicates the mobility between each pair of cells, and "paging contribution rate" indicates the contribution of paging of each cell that is resulted from MTC to the cell, and those all pertain to the scope of mobility modeling mechanism for constructing a mobility model.

Along with adopting different mobility model, how much mobility-related traffic incurred can be calculated under different network configuration. For example, when setting the border of LA differently, the change in LU can be calculated because how many times of people moving between each pair of cells is known. In the other side, when setting the border of MSC serving area, then the change in intra MSC Handover (HO) and inter MSC HO can be calculated. In addition, the time series prediction mechanism can forecast respectively a future mobility and a future traffic respectively based on the past mobility and the past traffic. In the preferred embodiment of the present invention, the mobility modeling mechanism can associate the time series prediction mechanism to predict the mobility change over time and suggests the better mobility model.

Regarding how to construct a mobility model for use in optimizing mobility management in a mobile communication network, please refer to those embodiments disclosed in U.S. patent application published. No. US-2004-0165561-A1, "SYSTEM FOR CONSTRUCTING A MOBILITY MODEL FOR USE IN MOBILITY MANAGEMENT IN A WIRELESS COMMUNICATION SYSTEM AND METHOD THEREOF", Ser. No. 10/369,678, filed on Feb. 21, 2003, published. No. US-2004-0165561-A1, published on Aug. 26, 2004 is hereby incorporated the content of this application by reference.

The mobility management optimization (MMO) can be achieved not only by means of modifying a plurality of registration areas, i.e., location areas, routing areas, etc., and modifying a plurality of serving areas of MSC, BSC, SGSN, even RNC for the target network plan but also by means of the consideration for the loads of network equipment to improve network traffic and minimize location updates and the like. Many mobile communication network operators have experience to face the situation of traffic congestion and expect to find the solution for prevention in advance.

The term "Traffic Modeling" means estimating the traffic loads, which represent voice, data and signaling traffic loads incurred in each network element (e.g., VLR, HLR, MSC, BSC, Cell, SGSN, PAPU, PCU, RNC, Node-B, etc.) and each link (e.g., A-interface, A-bis interface, etc.) in a mobile communication network. The traffic modeling mechanism is to simulate traffic loads, which can be changed by reconstructing network configuration. For example, modifying boundary of a location area results in the change of traffic load on A-interface. However, the prediction of the traffic growth will be more precise and accurate if the traffic modeling mechanism can associate the time series prediction mechanism, wherein the traffic growth includes the growth of subscribers, the increasing complexity of communication systems (2G/2.5G/3G), the growth of application function such as growth of Short Message Service (SMS), the traffic loads growth caused from mobility management, and so on. Accordingly, in the preferred embodiment of the present invention, the traffic modeling mechanism associates the time series prediction mechanism to generate a solution for offering traffic load prediction.

Furthermore, the embodiment of the present invention can specifically consider the different traffic loads caused by different types of LU, different types of paging, different types of handover, different types of cell update, etc, for various network elements. In this way, the optimal result for the whole network (both Base Station Subsystem and Network Switching Subsystem) is provided. The considered network elements include MSC, BSC, BTS, TRX (transceiver) capacity, etc.

The optimal plans will be output to OMC once the user is satisfied with the Mobility Management Optimization.

Figure 4:
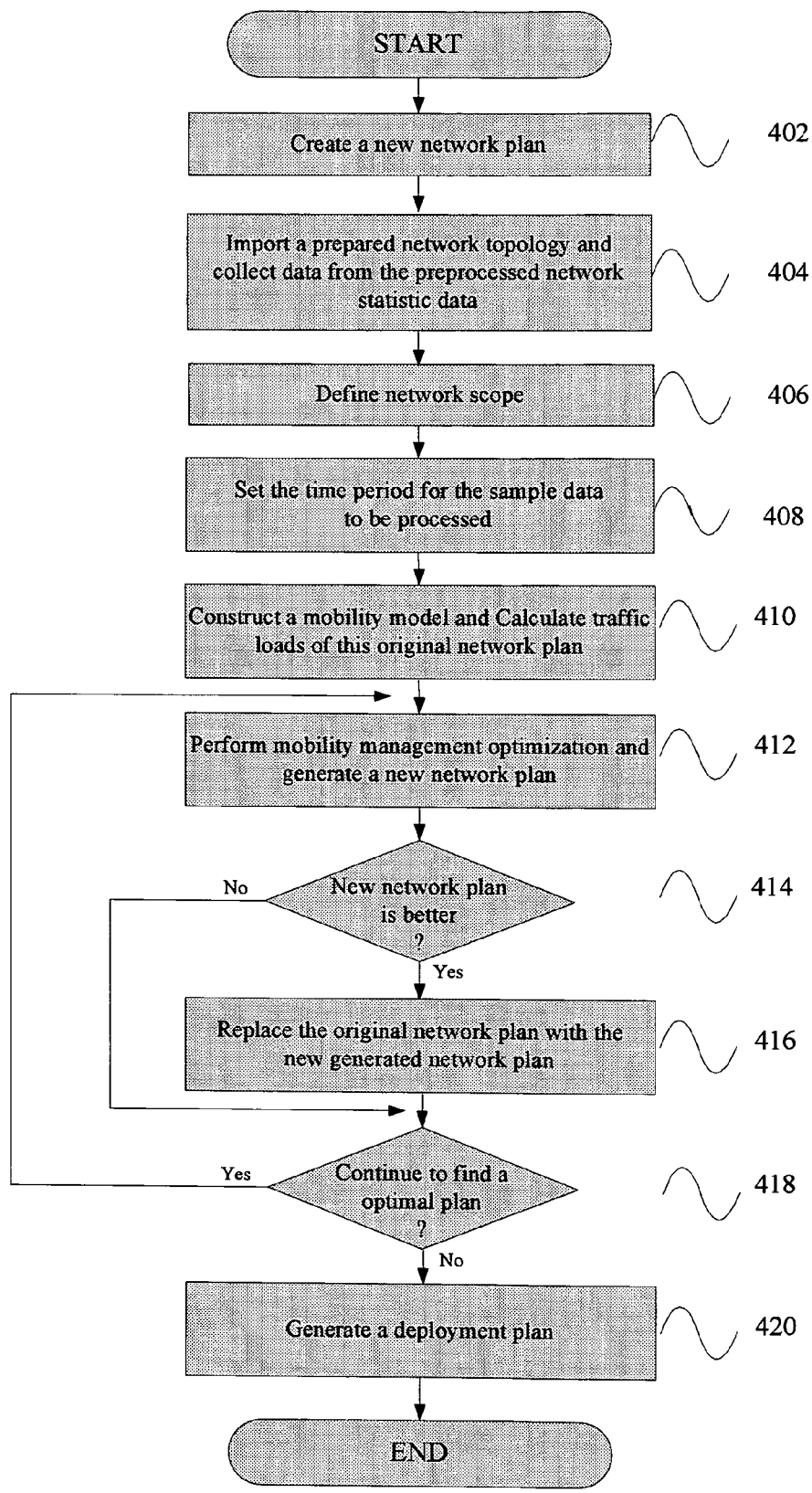
FIG. 4 illustrates the flowchart of an example of the method for network planning and mobility management optimization according to the preferred embodiment of the present invention.

FIG. 4 illustrates the flowchart of a method for network planning and mobility management optimization according to the preferred embodiment of the present invention. The embodiment of the present invention shall include processes necessary to be executed and options possible to be used. The application GUI window of the embodiment of the present invention will then be designed for these purposes accordingly:

The process of mobile network planning and mobility management optimization includes the following steps and will be described in detail as follows.

In the initial step 402, a user creates a new plan or loads an existing plan. In step 404, the user must import a prepared NT and collect data from the preprocessed network statistic data if the new plan is created in step 402. Also, the NT has to be preprocessed to an application-specific format before it can be imported into the memory. In step 406, the user can define the network planning scope representing a network area desired to be executed a network planning and mobility management optimization. The collected data from step 404 contain chronological data that may span years or months. The user does not need to use all these data, and he/she can simply use data for a specific length of time instead, for example, data for a single month. In step 408, the user sets the time period for the sample data to be processed, and then process these sample data. The network elements and their related statistics data can be presented on the map window of the application GUI window. If an existing plan is loaded in step 402, defining the network scope and processing the sample data are optional depending on the network scope need to be reselected or not.

Referring to FIG. 4 again, the process of mobility management optimization (MMO) is included. The mobility model is constructed according to the practical mobility behavior of the subscribers in the real world, and a mobility model of the existing network is generated as the basis for the optimization plan. The steps will be described in detail as follows.

Then, and it is constructed according to the network statistic data which realistically reflects the mobility behavior of the subscribers in the mobile network. Moreover, users may view the network elements (e.g., Cell, BSC, and MSC) and its related statistics data with various choices and their combination of representations (e.g., texts, graphs, numbers, maps, colors, legends and numbers) with direction via the map window of the application GUI window.

In step 410, a mobility model is constructed based on the original network status and the traffic loads of this network plan are calculated. In step 412, the user can generate a new network plan through performing a mobility management optimization (MMO) on the original network plan. In step 414, determining whether the new generated plan is better than the original one. If yes, replacing the original plan with the generated plan in step 416. If no, the original plan still is a current optimal plan. Proceed to step 418, if the user would like to continue generating another plan for MMO, the process goes back to step 412, otherwise proceed to step 420, and then the user can generate a deployment plan based on the MMO recommendation.

It will be understood that in the embodiment of the present invention, each block of the flowchart illustration of FIG. 4 and combinations of blocks in the flowchart illustrations of FIG. 4, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

Figure 5:
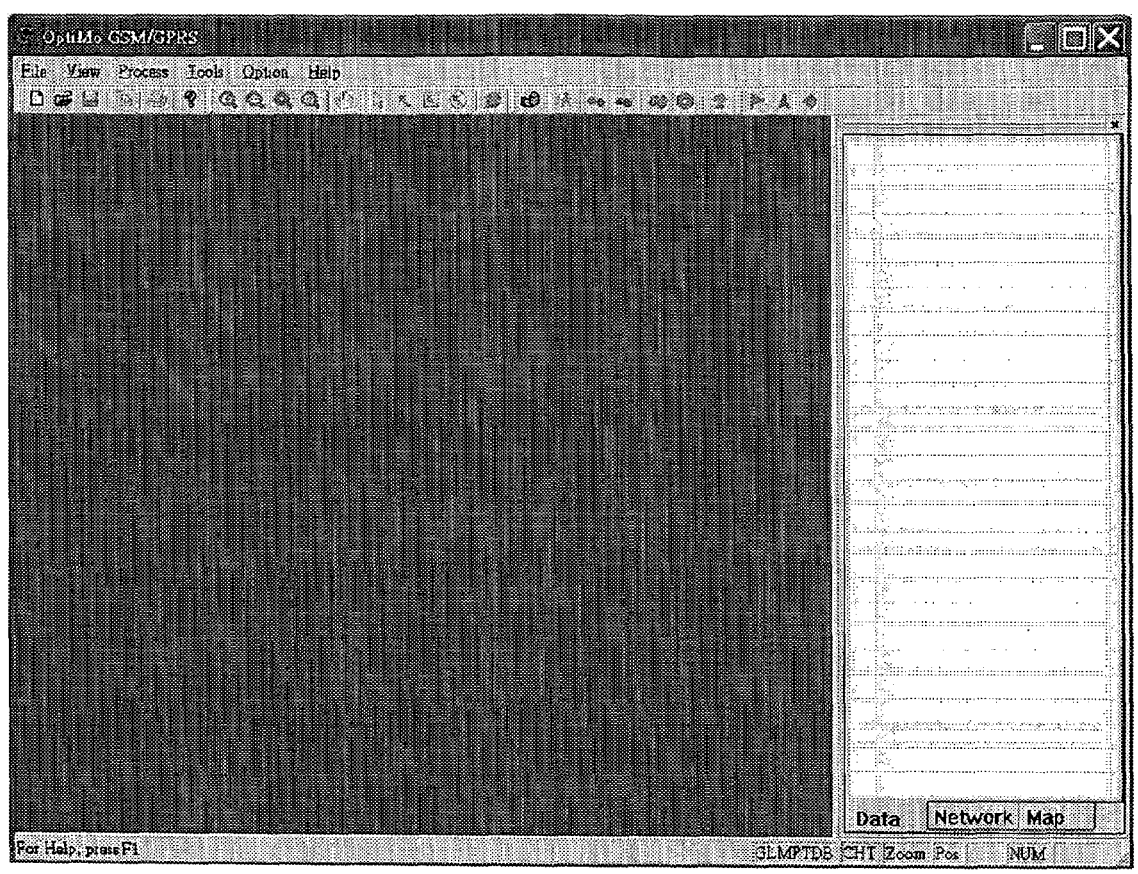
FIG. 5 illustrates the splash screen that is displayed to the user when the first embodiment of the current invention is started.

Graphical User Interface (GUI) Application Window:

FIG. 5 shows the splash screen that is displayed to the user when the first embodiment of the current invention is started. These functions described above may be arranged in the pop-up menus, function bars, or be activated by a hot key. The user may then choose to operate any of the functions available in the menu bar that is not grayed out.

Figure 6:
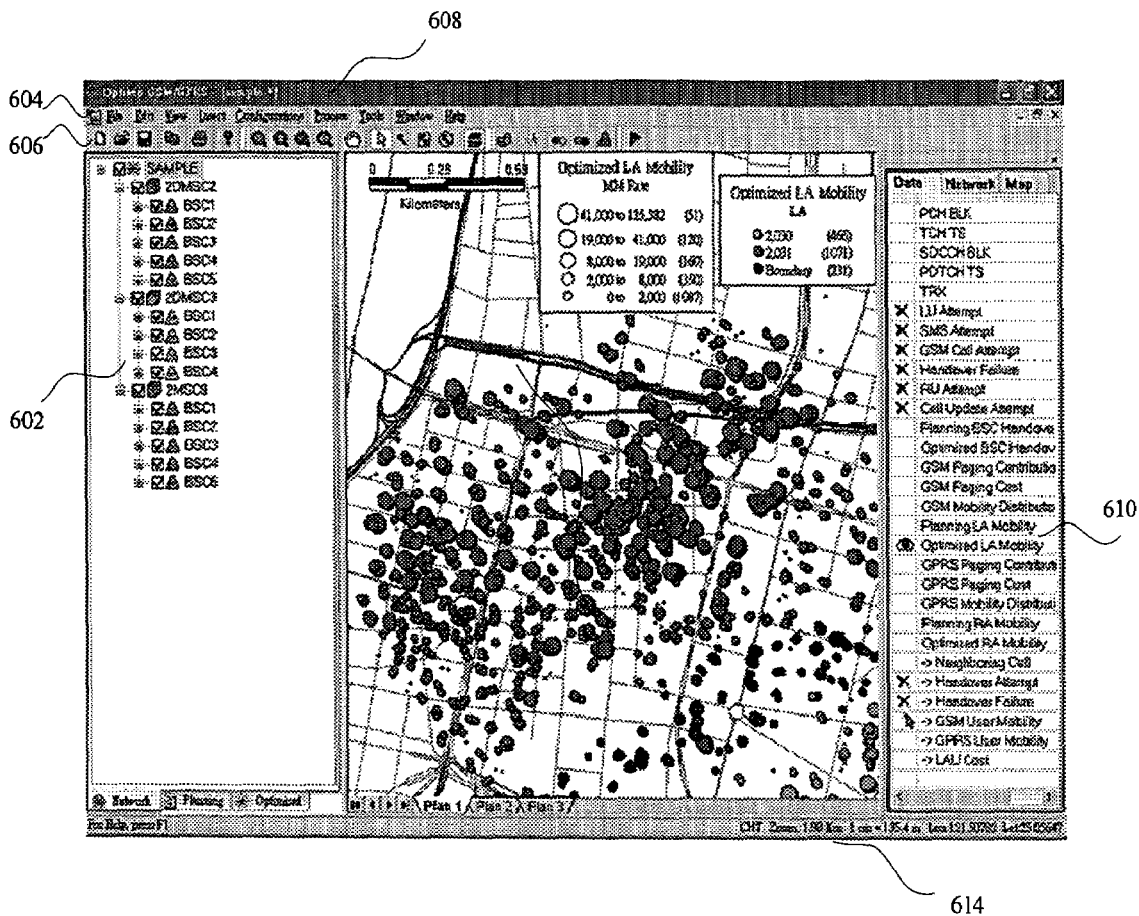
FIG. 6 illustrates a view after the network scope is defined and the sample data is processed for this plan.

When a plan is opened or a new plan is created, a view after defining the network scope and processing sample data for this plan is shown in FIG. 6. All kinds of geographic features, i.e., rivers, hills, roads, highways, schools, hospitals, and railway stations, etc., which may indicate the sources of the mobility subscribers will be displayed on GUI window.

A tree pane (602) displays a hierarchy of network elements that display a clear superior-subordinate relationship between network elements of each network plan. There are tree tabs included in the pane to view "Network Tree", "Planning Tree", and "Optimized Tree" respectively. The user can locate network elements in the tree pane when determining the network hierarchy, performing tasks in the tree pane includes, but are not limited to, inserting a site/cell into NT, deleting a site/cell from NT, adding a element to NT, removing an element from NT, locking a network element, unlocking a network element, finding a network element on the map window, moving an LA to another MSC, merging an LA with another LA, and so on. Alternatively, the hierarchy of network elements of the network plan displayed on the tree pane is modified by using a mouse-type control device to select a network element and drag and drop it into the desired location of the tree pane, and then the new version of superior-subordinate relationship between network elements within the network plan is updated automatically. Moreover, the user do not have to modify the associated NT file and save the plan after manipulating the tree pane, the new version of NT will be also updated automatically.

Pop-up Menu (604) includes the menus that users can pop up the function to select it. Tool bar (606) contains shortcut buttons to commands on Pop-up Menu. Title bar (608) shows the title and version of the program. Layers window (610) includes three kinds of layers: data layer, network layer, and map layer. Map window (612) displays the associated map, which associate multi-layer information including geographic information, network elements and their statistic data within the plan area. Status bar (614) shows the name of the licensed user, current zoom ratio, and map coordinates for the current selection on the map.

Figure 7A:
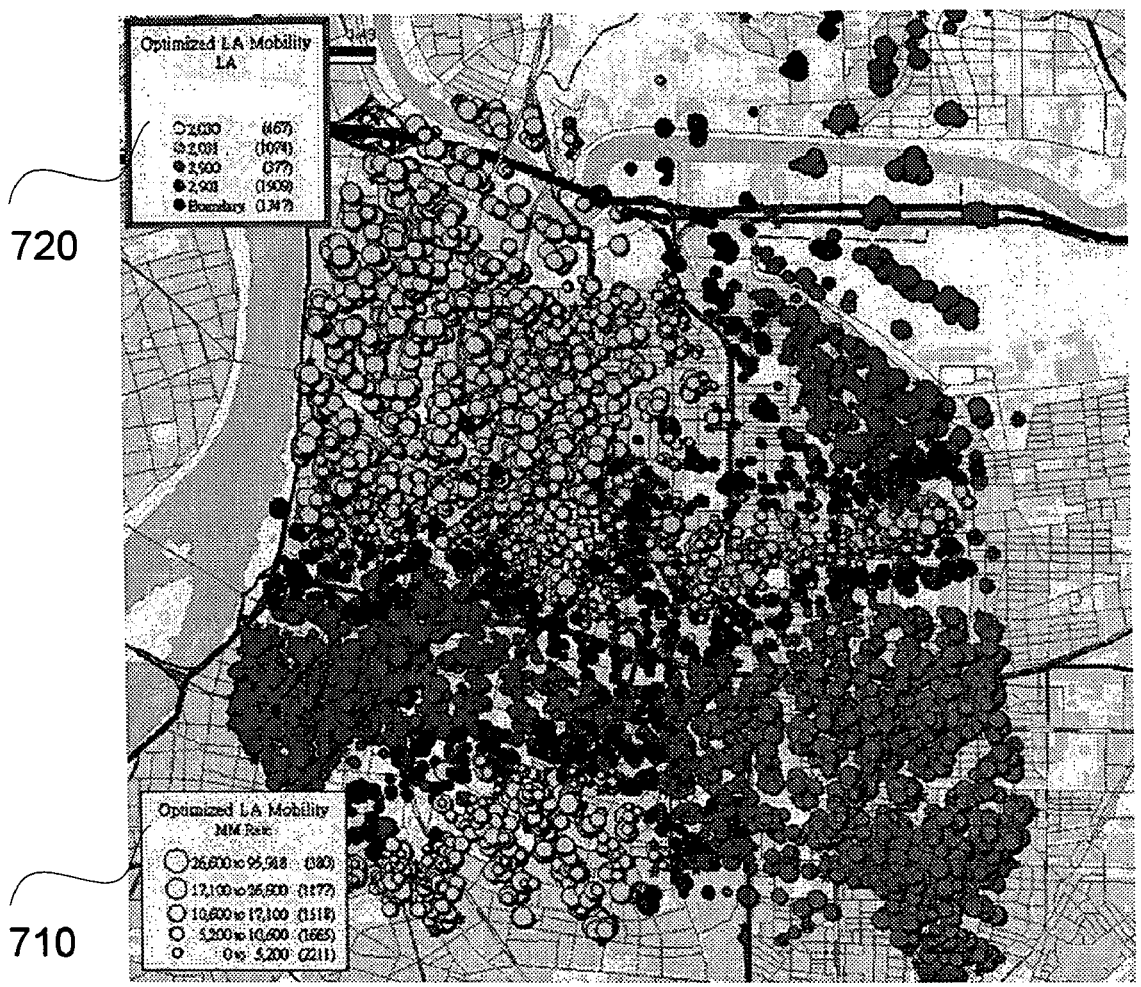
FIG. 7A illustrates the map window of the application GUI window with 2D representation for displaying the statistic data and their values, which are denoted by symbol patterns and their size.

In this embodiment of the present invention, there is provided a "map window", displayed in the middle pane of the application GUI window, as shown in FIG. 7A. It is a graphical representation of the current network plan with statistic data. The representation of the map window is composed of multi-layer information, wherein the geographical features act as a bottom layer, and the user can select the desired items for observation from the network element layer, and then those associated data of the selected items can be overlapped on the bottom layer and one layer is moved to the top of the layers stack if needed.

Representation for Displaying the Statistic Data on the Map Window

FIG. 7A illustrates the map window of the application GUI window with two-dimension (2D) representation for displaying the statistic data which are denoted by symbol patterns, such as dots, and the sizes of the symbol patterns represent values of the statistic data for the associated network elements. Additionally, the symbol patterns can be located on network elements on the map window except the statistic data pertaining to a directional data. However, the symbol pattern is located on the midpoint of two corresponding adjacent network elements on the map window if the statistic data pertaining to a directional data (e.g., directional handover ($HO_{ji}$)), and then the sizes of the symbols indicate sums of values of the statistic data from two corresponding adjacent network elements on the map window. Further, the different gray-scale colors of the symbols represent different geographic location area code (LAC) for specifically displaying the statistic data.

In Mobility Rate legend window (710) for LA mobility, the five different dot sizes represent five different ranges of mobility rate, and those area having the biggest dot-size represent those area with the highest mobility rate and in orderly those area having the smaller dot-size represent those area with lower mobility rate area. In LA legend window (720) for LA mobility, the different colors indicate the different LACs. For example, the boundary between the LAs indicated by the darkest color shown in FIG. 7A.

Figure 7B:
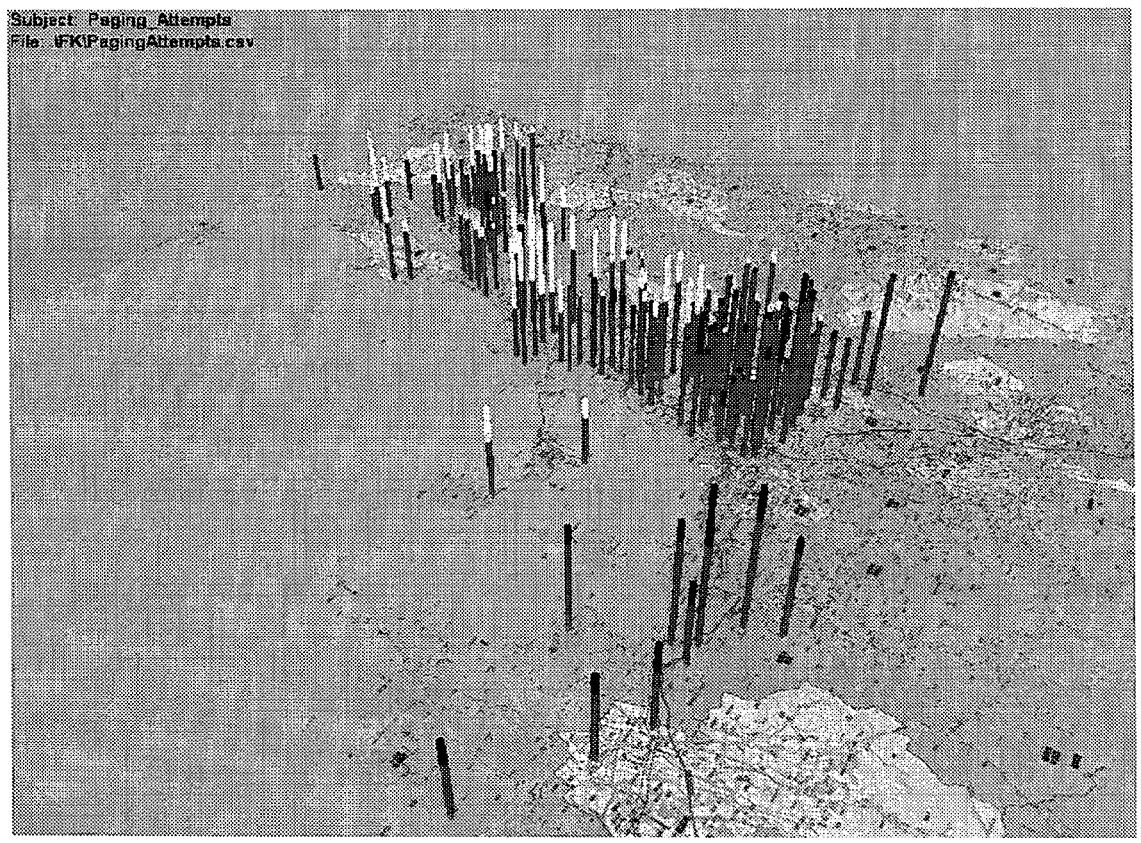
FIG. 7B illustrates the map window of the application GUI window with 3D representation for displaying the statistic data and their values, which are denoted by pillar patterns and their heights.

FIG. 7B illustrates the map window of the application GUI window with three-dimension (3D) representation for displaying the statistic data, such as pillars pattern, and the heights of the pillars represent values of the statistic data of the associated network elements. Additionally, the pillar patterns can be located on network elements except the statistic data pertaining to a directional data. However, the pillar pattern is located on the midpoint of two corresponding adjacent network elements on the map window if the statistic data pertaining to a directional data (e.g., directional handover ($HO_{ji}$)), and then the heights of the pillars indicate sums of values of the statistic data from two corresponding adjacent network elements on the map window.

Referring to FIG. 7B, the height of the pillar with gray part denoted the value of the statistic data from the associated network elements at time A, and the light part on the top of pillars denotes the increment of statistic data for the associated network elements from time A to time B, and the dark part on the top of pillars denotes the decrement of statistic data from time A to time B. Therefore, the user can identify high traffic areas and the traffic variation on the network by viewing the 3D representation.

Preprocessing and Importing of Network Topology

Network topology refers to the arrangements of network elements within a network. In GSM and GPRS networks, a network topology describes network elements including such as MSCs, BSCs, Cells, their physical and logical properties, and the relationships between and among elements (such as neighboring cells). First, the preprocessing and importing of the network topologies is executed. It should be noted that one or more Network Topology (NTs) are defined before any of the invention's features can be used, there should be one or more NT definitions. Likewise, the network topology must be preprocessed to an application-specific format in terms of the data file types such as .xls file type of Microsoft Excel before it can be imported into memory, and in the mean time an equivalent NT definition is created in the application database. The requested NT is then preprocessed and the preprocessed result is written into the NT database.

Network Statistic Data:

In the preferred embodiment of the present invention, the network statistic data include the following items: Location Update or Total Location Update (LU, which includes different types of location updates such as Location Area Update (LU), Periodic Location Update (PLU) and Attaching Location Update (ATA)); Handover (HO), which may be directional handover ($HO_{ji}$) or handover due to a specific cause (e.g., Power Budget Handover, $PBGT\ HO_j$); calls, which may be Mobile Terminating Call (MTC) or Mobile Originating Call (MOC); ratio of mobility behavior causing handover ($A_i$) and ratio of calls causing handover ($B_i$); SMS counter; Paging Number (PN), etc. Each of the desired items may help to reflect a specific aspect of mobility behavior of the subscribers. In the preferred embodiment, the Location Update (LU) and Handover (HO) are the necessary items. Other items are used for making the mobility management model of the present invention to be more accurate to the realistic behaviors of the subscribers for the mobile communication network.

The preprocessing of the network statistic data will be executed if necessary. Sometimes the statistic data formats may not be coherent since the network statistic data are generated by different elements of the system, the preprocessing step needs to unify the formats of the network statistic data so as to consistently apply the network statistic data for constructing the mobility model. Besides unifying data format, the preprocessing step contains missing statistic data recovery and data validation. The network statistic data of some desired items may be hourly based and other items may be daily based. The time unit of the network statistic data of all desired items could then be unified through executing the preprocessing step. The data are preprocessed to the format recognizable and convenient to be used for mobility management. The preprocessed network statistic data will then be stored in the database. After the data are preprocessed, they will be collected into memory.

Figure 8:
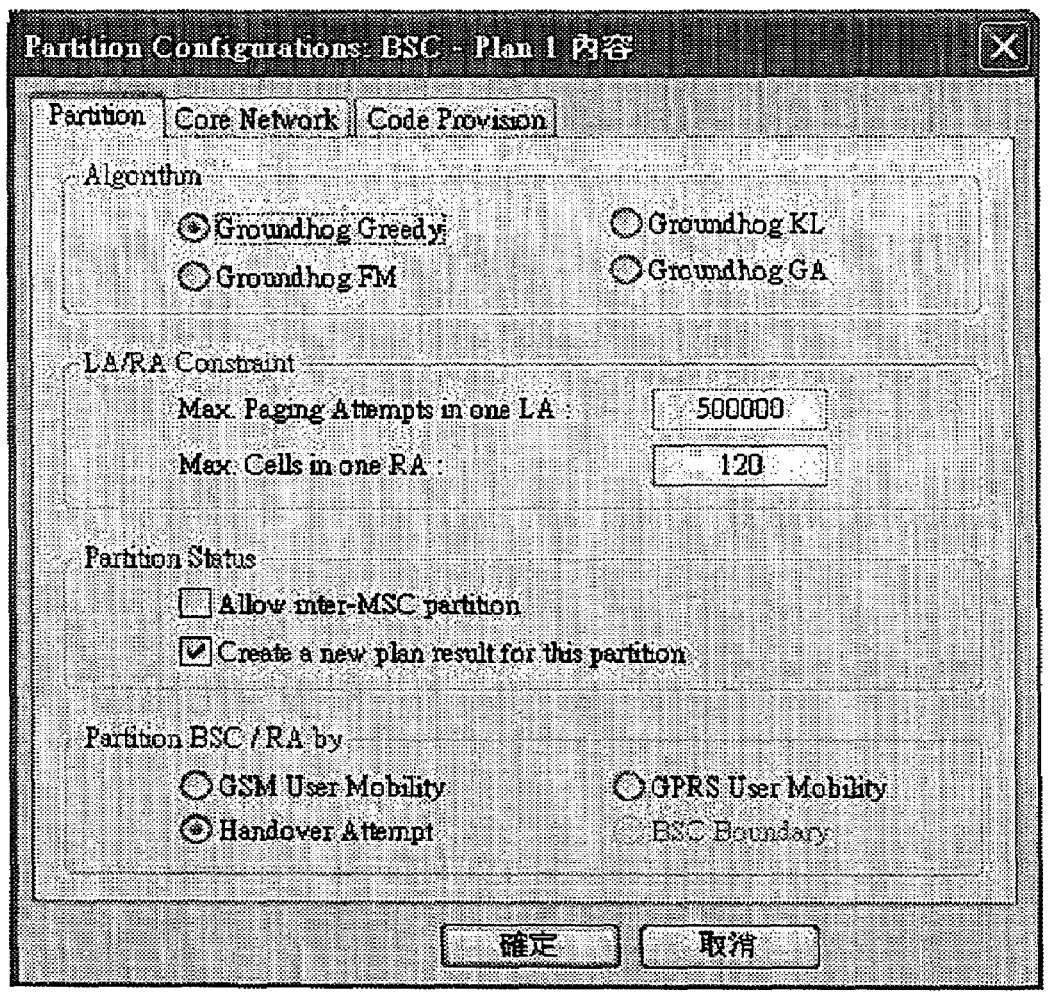
FIG. 8 illustrates an example of partition configuration according to the preferred embodiment of the present invention.

In the preferred embodiment of the present invention, a plurality of parameters can be configured through the application GUI window, as shown in FIG. 8.

Configuration for Time Point:

The "Time Point" configuration, belonging to one of the configurable parameters, allows the user to set the different time-unit of the network statistic data available (e.g., week, day, hour, minute or user-defined), and based on the time-unit the mobility model is generated. Usually, the preciseness of the mobility model and the performance of the MMO process will be better for the network statistic data based on a shorter time-unit (e.g., hour) than the network statistic data with a longer time-unit (e.g., day). It should be noted that responding to the availability/accessibility of the desired format such as resolution of the network statistic data, the system will be able to perform a switch among the different Time Units whenever necessary, i.e., available data could be transformed to those in the Time Unit wanted.

Configuration for Traffic Modeling:

The "Traffic Modeling" configuration, belonging to one of the configurable parameters, allows the user to set the unit load of specific traffic with the measurement unit in "seconds" or "byte" respectively in term of Location Area Update (LU) load for Inter Visitor Location Register (VLR), LU load for Intra VLR, Routing Area Update load for Inter SGSN (GPRS Support Node), Routing Area Update load for Intra SGSN, URA update load for Inter RNC (Radio Network Controller), URA update load for Intra RNC, A-interface (between BSC and MSC) load for Inter VLR, A-interface (between BSC and MSC) load unit for Intra VLR, and paging load. The traffic model can simulate the traffic load of each network element and each link after some settings have been changed in a mobile communication network.

Configuration for Capacity Constraint:

The "Capacity Constraint" configuration, belonging to one of the configurable parameters, allows the user to set limits for each network element and each link. The configuration for capacity constraint includes setting the values for the maximum number of paging attempts per LA and the maximum number of cells per RA, as well as selecting if the maximum number of TRXs per BSC, the maximum number of TRXs per MSC, the maximum number of Erlang per BSC, the maximum number of Erlang per MSC needed to be constrained, etc.

Configuration for Algorithm:

The "Algorithm" configuration, belonging to one of the configurable parameters, allows the user to select an algorithm for partitioning the planned cells, sites in the defined NT into LAs/RAs, BSCs/MSCs under the specified capacity constraints such as paging attempt, after the mobility model is generated. The Partition Unit can also be selected. Site-level partitioning means that Cells belonging to the same Site will be kept in the same Paging Area. BSC-level partitioning means that Cells belonging to the same BSC will be kept in the same Paging Area. On the other hand, there are two things to be noticed: First, the implementation of different levels of partitioning is based on actual needs, for example, the acceptable variation range before and after the partitioning installment. Second, generally speaking, unless it's just some "fine tuning" intended, i.e., Cell-level partitioning, usually there will be site-level or up partitioning executed.

Defining Network Scope and Processing the Related Data:

In the preferred embodiment of the present invention, the function of "Define Network Scope" allows the user to define scope of the network in which mobility management optimization will be executed, i.e., the user can focus on all or only part of the network that contains the specific MSC's/BSC's/Sites/Cells for mobility management or/and mobility management optimization. The function of "Process Sample Data" will then be executed to process all or part of the imported network statistic data that is related to the defined scope after a Network Scope is defined.

Constructing Mobility Model:

In the preferred embodiment of the present invention, the function of "Generate Mobility Model" is based upon network statistic data containing different aspects and metrics of subscribers' behavior from different parts of the wireless network. The mobility model implies knowledge such as how many subscribers move from one cell to another at different times. As mentioned above, the contributing information sources may include time series of counters and success ratio of the location update, handover, paging and calls, etc. Each of those observations by itself reveals only a slice of the complete state of the subscribers' mobility behavior. The embodiment of the present invention interweaves the data gathered from those disparate information sources to construct the mobility model of subscribers, which is an accurate spatial-temporal model of subscribers' mobility behavior over a period of time and between each pair of cells.

Figure 9:
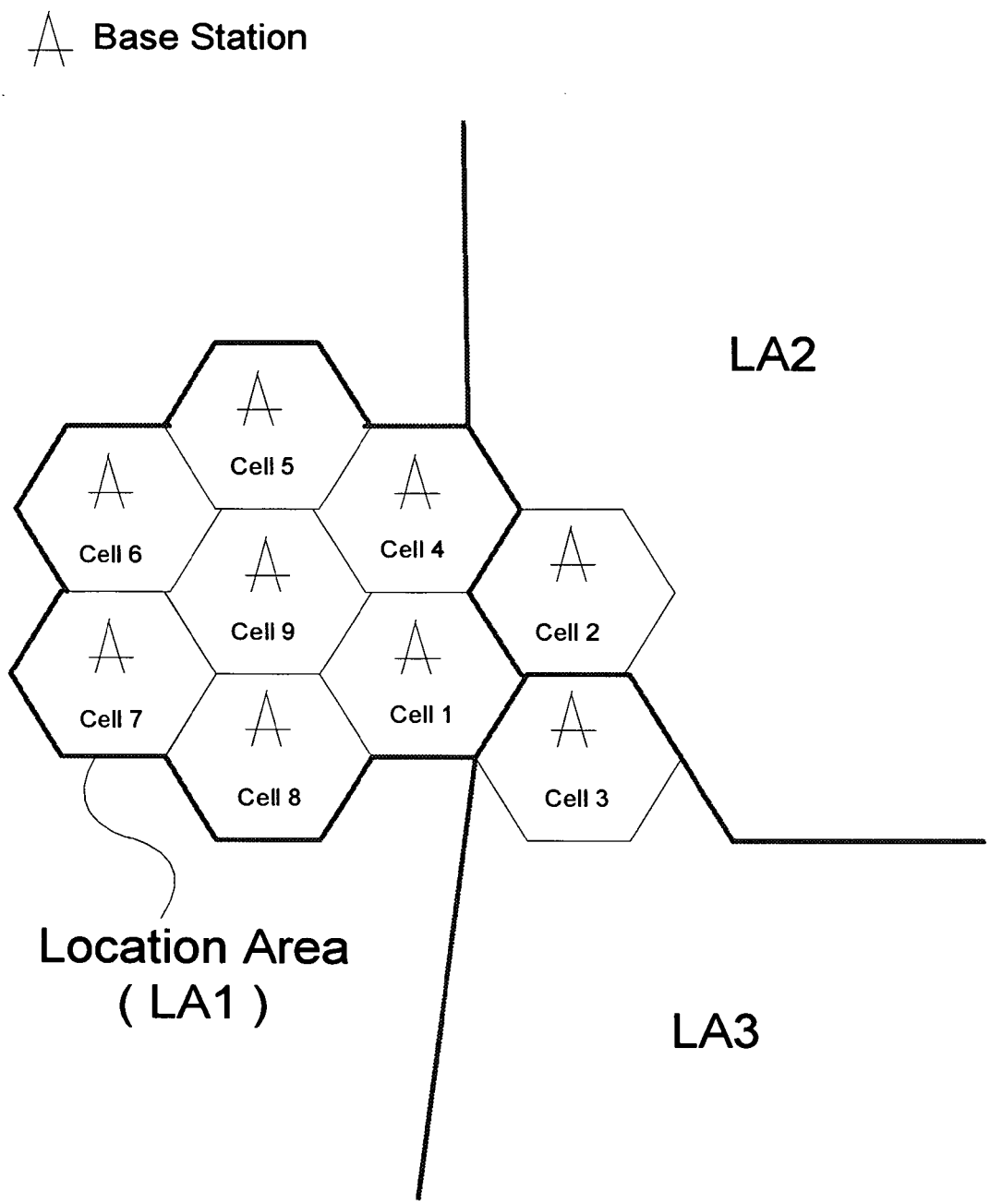
FIG. 9 illustrates a sample scheme of a mobile communication network used to explain a mobility model construction method of the present invention.

In order to construct the mobility model, the behavior of the subscribers corresponding to each cell is determined first. Referring to FIG. 9, a diagram is used to explain the way to implement the mobility model construction method of the embodiment of the present invention. Taking $CELL_1$ as an example, it belongs to the location area LA1 and is a border cell of LA1. $CELL_1$ is neighbor to $CELL_2$ and $CELL_3$, which belong to the location area LA2 and LA3 respectively, as shown in FIG. 9. In the preferred embodiment, when constructing the mobility model of the system, the mobility behavior of the subscribers in each border cell of the location area is determined first, and then the mobility behavior of the subscribers in the inner cells, which are not border cells, of the location area is determined.

It should be noted that not only the location update procedure will be executed by the mobile station when the subscriber crosses the border of the specific location area to another location area, but also the location update procedure will be taken place when a subscriber has stayed in the specific location area over a specific period of time without sending information to the mobile communication network, or when a mobile communication device is turned on and is attached to a mobile station during a subscriber is in the specific location area.

The Location Update (LU1) of CELL1 represents the total number of location updates recorded in CELL1 during a predetermined time period. In the preferred embodiment, the magnitude of Location Update ($LU_i$) can be determined by the following items: (a) Sum of Mobility Rate ($\Sigma D_{ji}$), which represents the total number of the subscribers moving from the neighbor cells (e.g. CELL2 and CELL3) belonging to another location area (e.g. LA2 and LA3 respectively) into CELLi (e.g. CELL1). (b) Periodic Location Update ($PLU_i$) represents the Location Update triggered by mobile stations that have not sent information to the network over a specific period of time during when their final appearance is in $CELL_i$. (c) Attaching Location Update ($ATA_i$), which represents the times of mobile stations being turned on in CELLi during the predetermined time period. The relations among Sum of Mobility Rate ($\Sigma D_{ji}$), Periodic Location Update ($PLU_i$) and Attaching Location Update ($ATA_i$) selected from the set of network statistic data can be shown in the mobility equation (Eq. 1) as follows:

$$LU_i = f_l(\Sigma_{j, \text{cell } j \text{ is adjacent to cell } i, \text{ and cell } j \text{ belongs to a different LA from cell } i} D_{ji}, PLU_i, ATA_i) \quad (Eq.1)$$

A reasonable $f_l$ can be chosen according to practice. For example, an applicable form of Eq.1 and $f_l$ is:

$$LUi = \Sigma_{j, \text{cell } j \text{ is adjacent to cell } i, \text{ and cell } j \text{ belongs to a different LA from cell } i} D_{ji} + PLUi + ATAi \quad (Eq.1')$$

It should be noted that Sum of Mobility Rate ($\Sigma D_{ji}$) represents the total number of mobile stations moving into $CELL_i$ from cells belonging to a different location area from that of $CELL_i$. Sum of Mobility Rate ($\Sigma D_{ji}$) is a necessary term in the right hand side of equation (Eq.1), and other terms in the right hand side may be skipped in certain embodiments, in exchange for faster processing while lower accuracy. If terms in the right hand side except for Sum of Mobility Rate ($\Sigma D_{ji}$) are skipped, Location Update (LU) is considered to be close to Location Area Update described in the Description of the Related Art section of the present specification. In addition, all other situations than those disclosed above where the mobile station will execute location updates can be put into consideration when constructing the mobility model.

When a mobile station moves from the coverage of CELL1 to that of CELL2, the connection between the mobile station and the network system must be changed from via the base station of CELL1 to via that of CELL2. This process is called "handover". There are different causes of handover such as power budget, quality, interference, or level of signals being better in the new cell. Note that not only the mobility behavior of subscribers but also some other causes can produce handovers. According to the experimental simulations and practical experiences, Power Budget Handover (PBGT HO), which occupies most handovers, is usually more frequently caused by the mobility behavior of subscribers than handovers from other causes. Thus, a substantial portion of handovers represent the times of mobile stations moving from other neighbor cells, such as from $CELL_j$ to $CELL_i$. In a typical mobile communication network, there can be different types of handover statistic data. For instance, Directional Handover ($HO_{ji}$) statistic data record the times of subscribers moving from $CELL_j$ to $CELL_i$, with knowledge of both the source cell ($CELL_j$) and destination cell ($CELL_i$). Thus, in certain mobile communication networks, Power Budget Handover (PBGT $HO_{ij}$) statistic data may contain more specific directional information by recording the number of handovers caused by power budget, from the source cell ($CELL_j$) to the destination cell ($CELL_i$). On the other hand, in some other mobile communication networks, Power Budget Handover (PBGT $HO_i$) statistic data may only record the total number of handovers caused by power budget, from all neighboring cells into the destination cell ($CELL_i$), without differentiating the source cells.

The magnitude of the handover can be related to factors such as: (a) Mobility Rate ($D_{ji}$), which represents the times of the mobile stations moving from $CELL_j$ to $CELL_i$; and (b) Call Rate (e.g. $C_i$ or $C_j$), which is a function of Mobile Terminating Call (e.g. $MTC_i$ or $MTC_j$) and Mobile Originating Call (e.g. $MOC_i$ or $MOC_j$). Mobile Terminating Call (e.g. $MTC_i$ or $MTC_j$) represents the times of subscribers located within a cell (e.g. $CELL_i$ or $CELL_j$) receiving calls, and Mobility Originating Call (e.g. $MOC_i$ or $MOC_j$) represents the times of subscribers located within a cell (e.g. $CELL_i$ or $CELL_j$) calling out.

In one embodiment, the relations among Directional Handover ($HO_{ji}$), Mobility Rate ($D_{ji}$), Call Rate ($C_{ij}$), Mobile Terminating Call ($MTC_i$ or $MTC_j$) and Mobility Originating Call ($MOC_i$ or $MOC_j$) can be defined by the mobility equations (Eq.2 and Eq.3) as follows:

$$HO_{ji} = f_h(D_{ji}, C_{ij}) \quad (Eq.2)$$

$$C_{ij} = f_c(MTC_i, MOC_i, MTC_j, MOC_j) \quad (Eq.3)$$

Eq.2 and $f_h$, as well as Eq.3 and $f_c$, can further be implemented with a reasonable selection of linear or nonlinear equations. For instance, one of the simplest forms applicable is:

$$HO_{ji} = D_{ji} * A_i + C_{ij} * B_i \quad \text{(Eq.2')}$$

$$C_{ij} = MTC_i \quad \text{(Eq.3')}$$

$A_i$ is the ratio of mobility behavior causing handover, and $B_i$ is the ratio of calls causing handover. The parameters $A_i$ and $B_i$, as well as $D_{ji}$, of the border cells can be derived by applying the network statistic data (e.g. $LU_i$, $PLU_i$, $ATA_i$, $MTC_i$, $MOC_i$, $MTC_j$, $MOC_j$, $HO_{ji}$ of the border cells) corresponding to the equations (Eq.1', Eq.2' and Eq.3'), and we can come up with the $A_i$ and $B_i$ that generate the best result (e.g. with minimum least square error). Therefore, the mobility behavior of the subscribers corresponding to $CELL_i$ which is a border cell can then be determined. There can be different $A_i$ and $B_i$ for different times, when the $CELL_i$ is having different loads, or between different pairs of cells, given enough statistic data for calculation. Therefore, $A_i$ and $B_i$ can be further specified as $A_{it}$ and $B_{it}$, $A_{il}$ and $B_{il}$, or $A_{ij}$ and $B_{ij}$. In addition, all other situations than those disclosed above where the mobile station will execute handover or whose counter is related to handover can be put into consideration when constructing the mobility model.

Refer to FIG. 9 again, the mobility behavior of the subscribers corresponding to all border cells of LA1, such as CELL1, CELL4, CELL5, CELL6, CELL7, and CELL8 can be calculated in the same manner. Since $A_i$'s of all border cells of LA1 are available, the $A_i$'s of inner cells of LA1, such as CELL9, can be calculated by those of the neighboring cells according to the following mobility equation (Eq.4):

$$A_9 = f_a(A_1, A_2, A_3, A_4, A_5, A_6, A_7, A_8) \quad \text{(Eq.4)}$$

Since $B_i$'s of all border cells of LA1 are available, the $B_i$'s of inner cells of LA1, such as CELL9, can be calculated by those of the neighboring cells according to the following mobility equation (Eq.5):

$$B_9 = f_b(B_1, B_2, B_3, B_4, B_5, B_6, B_7, B_8) \quad \text{(Eq.5)}$$

Eq.4 and $f_a$, as well as Eq.5 and $f_b$, can further be implemented with a reasonable selection of linear or nonlinear equations. For instance, one of the simplest forms applicable is:

$$A_9 = (A_1*HO_{19} + A_2*HO_{29} + A_3*HO_{39} + A_4*HO_{49} + A_5*HO_{59} + A_6*HO_{69} + A_7*HO_{79} + A_8*HO_{89})/(HO_{19} + HO_{29} + HO_{39} + HO_{49} + HO_{59} + HO_{69} + HO_{79} + HO_{89}) \quad \text{(Eq.4')}$$

$$B_9 = (B_1*C_{19} + B_2*C_{29} + B_3*C_{39} + B_4*C_{49} + B_5*C_{59} + B_6*C_{69} + B_7*C_{79} + B_8*C_{89})/(C_{19} + C_{29} + C_{39} + C_{49} + C_{59} + C_{69} + C_{79} + C_{89}) \quad \text{(Eq.5')}$$

Another example of more accurate but computationally intensive implementation of Eq.4 and $f_a$ is:

$$A_9 = (A_1*D_{19} + A_2*D_{29} + A_3*D_{39} + A_4*D_{49} + A_5*D_{59} + A_6*D_{69} + A_7*D_{79} + A_8*D_{89})/(D_{19} + D_{29} + D_{39} + D_{49} + D_{59} + D_{69} + D_{79} + D_{89}) \quad \text{(Eq.4'')}$$

The simultaneous equations of Eq.1~Eq.5 of cells in the location area can thus be listed, and $A_i$, $B_i$ and $D_{ji}$ can be solved with standard statistical methods given enough data points of network statistic data. The mobility behavior of the subscribers can thus be determined. The mobility model which is based on various network statistic data collected from the real network system to formulate the mobility behavior of the subscribers in the real network system can thus be constructed.

Every single cell in the location area contributes to the total paging number of the location area ($PN_{L1}$). Taking $CELL_1$ of LA1 as an example, Paging Rate ($PR_1$) of $CELL_1$ represents the number of paging of $PN_{L1}$ contributed by paging subscribers in $CELL_1$. $PR_1$ can be calculated according to the mobility equation (Eq.6) as follows:

$$PR_1 = (MTC_1/MTC_{L1})*PN_{L1} \quad \text{(Eq.6)}$$

$MTC_1$ represents the times of subscribers, located within $CELL_1$, receiving phone calls. $MTC_{L1}$ represents the times of subscribers, located within $LA_1$, receiving phone calls. Therefore, $MTC_{L1} = \Sigma MTC_i$, for all CELLi's belonging to LA1. Paging Rate of other cells can thus be calculated in the same manner.

It should be noted that all other situations than those disclosed above where the mobile station will execute paging can be put into consideration when constructing the mobility model.

As another example, the mobility model can also be constructed starting with the following equations (i,j are indices to CELL's):

$$LU_i = (\Sigma_{j,\ cell\ j\ is\ adjacent\ to\ cell\ i,\ and\ cell\ j\ belongs\ to\ a\ different\ LA\ from\ cell\ i} D_{ji}) * K_i \quad \text{(Eq.7)}$$

$$HO_{ij} = D_{ij} * A_i + C_i * B_i \quad \text{(Eq.8)}$$

$$PBGT\ HO_i = (\Sigma_{j,\ cell\ j\ is\ adjacent\ to\ cell\ i} D_{ij}) * E_i + C_i * F_i \quad \text{(Eq.9)}$$

$$2*C_i = MTC_i + MOC_i \quad \text{(Eq.10)}$$

Eq.7 is similar to Eq.1', and Eq.8 is similar to Eq.2', except certain terms are ignored because they are small in magnitude relatively. Among all different types of handovers, Eq.9 utilizes statistic data of certain handovers due to a specific causewhich may most likely result from subscribers' mobility behavior. For example, PBGT HO, which stands for power budget handover, is the handover due to the cause of power budget. In our experience, PBGT HO is more likely to result from subscribers' mobility behavior, as compared to handovers caused by quality, interference or level. In some mobile communication networks, PBGT $HO_i$ cannot be differentiated in terms of the source cells, and in some other mobile communication networks, on the contrary, PBGT $HO_{ij}$ can be differentiated. In this embodiment, PBGT $HO_i$, which cannot be differentiated by the source cells, is used as an example. Because PBGT $HO_i$ can be caused by mobility behavior of subscribers, the first term in Eq.9 is proportional to the times of subscribers moving into $CELL_i$. However, PBGT $HO_i$ can also result from random noises or interferences that decrease the power level of signals such that a handover is needed to maintain the signal level, hence the second term in Eq.9 reflects the fact that a portion of the calls will suffer from a decrease in signal level resulting in a power budget handover.

The mobility model construction can also be extended with first applying a step of smoothing the call rate $C_i$. This step is to smooth the noises in the data to get the underlying pattern. Therefore, instead of Eq.10, we have the following:

$$C_i = [(MTC_i + MOC_i)/2 + \lambda * \Sigma_{j,\ cell\ j\ is\ adjacent\ to\ cell\ i}, (MTC_j + MOC_j)/2]/[1 + \lambda * \Sigma_{j,\ cell\ j\ is\ adjacent\ to\ cell\ i} (MTC_j + MOC_j)/2],\ \text{where } \lambda \text{ is a smoothing factor} \quad \text{(Eq.11)}$$

$\lambda$ can be assumed a value or obtained by optimization based on cross-validation, which is to be described.

The mobility model construction can further be extended by obtaining a preliminary estimate of the mobility model. In this example, $C_i$ is substituted back into Eq.8 to obtain a preliminary estimate of the mobility model. In the preferred embodiment, the value of $B_i$ is obtained by doing a regression analysis with $HO_{ij}$ being the regressand and $C_i$ being the regressor. $B_i$ is in general i dependent. In one embodiment, $B_i$ is assumed to be a constant over all cells but it can also be obtained by doing regression analysis on subsets of the cells and optimized using cross-validation. A preliminary estimate of $D_{ij}$ can thus be calculated:

$$D_{ij}*A_i=HO_{ij}-C_i*B_i \qquad (Eq.12)$$

Again, $A_i$ can be assumed a value or obtained by optimization based on cross-validation.

The next step is to use this "preliminary $D_{ij}$" to compute $\Sigma_j D_{ji}$ and $\Sigma_j D_{ij}$ in Eq.7 and Eq.9. Similar to the case of $B_i$, coefficients $K_i$, $E_i$ and $F_i$ are calculated by doing linear regression analyses on Eq.7 and Eq.9 with $\Sigma_j D_{ji}$, $\Sigma_j D_{ij}$ and $C_i$ being the regressors, and $LU_i$ and PBGT $HO_i$ being the regressands. The regression analyses also yield two root mean-square-errors $\sigma K_i$ and $\sigma E_i$ for Eq.7 and Eq.9 respectively. Finally, all the data are put together to compute the mobility model:

$$Dfinal_{ij}=[D_{ij}+(K_i/\sigma K_i*\Sigma_j D_{ji}/\text{number of cells adjacent to cell } i \text{ and residing in a different } LA \text{ from cell } i)+(E_i/\sigma E_i*\Sigma_j D_{ij}/\text{number of cells adjacent to cell } i)]/(1+K_i/\sigma K_i+E_i/\sigma E_i) \qquad (Eq.13)$$

The accuracy of a model can be verified by cross-validation. The constructed mobility model $D_{ij}$ can be substituted into the right-hand side of Eq.7, and we can compare the resulting number with the available real data $LU_i$. This comparison yields a measure of the accuracy of the model. The values of $\lambda$ and $A_i$ can be optimized based on this measure. Modifications and combinations of the above two methods of mobility model construction can be done to yield various mobility models. For example, a preliminary mobility model $D_{ij}$ can be computed using the first method instead, and then the final estimator for $D_{ij}$ can be obtained by doing regression analyses on Eq.7 and Eq.9, and then by evaluating Eq.13. Cross-validation can be carried out over all the cells or on local cells to indicate the degree of validity for each of the mobility model. Therefore, a most accurate mobility model can be found for each pair of cells.

Time Series Function:

The embodiment of the present invention also has the function of displaying or recording time series data. This makes it easy for the user to read, compare, analyze, and predict the trend of the network topology, user behaviors and related counters like LU and Paging, etc. Time Series Data of network topology include the followings:

(1) Past Records: Since each cell, site, BSC or MSC, etc., have the data of building date, the history of network topology may be easily gained.

(2) Future Planning: The future planning may be generated by the user manually. It depends on the deployment plan, budget, coverage range and loads, etc. The deployment plan mentioned will bring out a specific future planning.

In terms of the Data Source: When the data displayed are from the Past, the text "Past Records" will be displayed. When the data displayed are from the future, the text "Future Prediction" will then be displayed. Data matching the current times are seen as "Future Prediction."

Likewise, time series of Mobility Management include the followings:

(1) Past Records: The past records of mobility management data are included like Mobility Rate, LU, Paging, MTC and SMS, etc.;

(2) Future Prediction: The future prediction of mobility management data include like Mobility Rate, LU, Paging, MTC and SMS, etc.

The user interface of time series of Mobility Management is the same as that of time series of Network Topology just mentioned. One of the differences lies in the Display Item, which can be Mobility Rate, LU, Paging, Paging Cost, etc. There are four display methods for mobility management:

(1) Bar Chart: It's almost the same as the one described previously except for different time range and time segment;

(2) Line Chart: It's almost the same as the one described previously except for different time range and time segment;

(3) Directional Line: It's almost the same as the one described previously except that the function here will display the layer by time sequence;

(4) Circle on the Map: It's almost the same as the one described previously except that the function here will display the layer by time sequence.

Optimizing Registration Area and Serving Area:

In the preferred embodiment of the present invention, mobility management optimization can be achieved by the modification of the LA, RA, or LA/RA together, BSC, MSC, or LA/RA/BSC/MSC together. For example, the K-L (Kernighan Lin) algorithm is used for determining the scope of the location area and serving area but it is not the essential limitation of the present invention. All other algorithms known by people skilled in the art which are suitable for determining the scope of the location area and serving area can be used to implement the embodiment of the present invention.

It should be noticed that the parameters of mobility management are not limited to the scope of the location area and serving area; the values of different timers such as the circuit-switch/packet-switch Periodic Location Update timer, RRC Connection Release timer and Inactivity timer; network topology and connectivity of different network elements such as MSC, BSC and BTS; paging parameters such as paging duration, paging retry times, paging scope and sequence of paging; method of handover (e.g. hard, soft or softer handover) and hysteresis factor of handover; or the coverage of cells, etc. In addition, the algorithm used for adjusting parameters of mobility management is not limited to the K-L algorithm. Other applicable algorithms include, but are not limited to, Greedy algorithm, F-M (Fiduccia Mattheyses) algorithm, Genetic Algorithm, and Simulated Annealing algorithm. For information on K-L algorithm, please refer to "An Efficient Heuristic Procedure for Partitioning Graphs" (The Bell system technical journal, 49 (1): 291-307, 1970). For information on Greedy algorithm, please refer to "Introduction to Algorithms: A Creative Approach, chapter 7" (pp. 210~pp. 211, Addison-Wesley Publishing Company, 1989). For information on F-M algorithm, please refer to "A Linear-Time Heuristic for Improving Network Partitions" (Proc. of DAC, 1982). For information on Genetic Algorithm, please refer to "A Genetic Algorithm for Optimizing Multiple Part Placement to Reduce Build Time" (Proceedings of the Fifth International Conference on Rapid Prototyping, Dayton, Ohio, June 1994). For information on Simulated Annealing algorithm, please refer to "Location Area Planning in Cellular Networks Using Simulated Annealing" (Proceedings of IEEE Infocom, The Conference on Computer Communications 2001, Anchorage, Ak., Apr. 22-26, 2001). The above-mentioned publications are incorporated herein by reference. All other optimization algorithms can be used as well.

Then, determining whether the new way for location area scope definition is a better solution than the original one through comparing the system's overall traffic loads of the new location area scope to those of the original location area scope is executed, and then the report showing percentage change and determination between the new and old plans can be rendered on the application GUI window. If the system's overall traffic loads of the new location area scope are lower than those of the original location area scope, replacing the original location area scope with the new one as the current basis of location area scope will be executed, and the process will return to the point of executing algorithm of mobility model again. If the system's overall traffic loads from any other location area scope configurations are all higher than the current basis of location area scope configuration, then the current basis of location area scope configuration is proven to be the best solution for mobility management through executing the K-L algorithm.

In this example, a cell is the smallest unit in the scope of the location area. Practically, the smallest unit can be different according to different systems. For example, some operators may prefer to use a Base Station, a Node-B or an Access Point as the smallest unit for the scope of the location area.

Besides K-L algorithm, other optimization algorithms, such as F-M (Fiduccia, C. M. and Mattheyses, R. M.) algorithm, Greedy algorithm, Genetic algorithm, and Simulated Annealing algorithm, etc., can be executed as well, when optimizing mobility management of the mobile communication network. Since the mobility model of the embodiment of the present invention is constructed based on the actual mobility behavior of all subscribers, not the subjective experiences from the system operators, the result of mobility management through executing the method disclosed in the specification can be proven to lower the overall traffic loads of the system. In this manner, the capital expenditure and hardware expansion of the system operators can thus be decreased.

The method disclosed in the embodiment of the present invention is for use in all different kinds of mobile communication networks, including not only the second generation mobile communication networks such as GSM, CDMA and PDC, but also more advanced systems such as 2.5G systems like GPRS and EDGE, 3G systems like WCDMA, CDMA2000 and TD-SCDMA, and other mobile communication networks such as PHS and Wireless LAN/IPv6 networks. The terms used in different systems may be different but the concept is similar. For example, the concept of the location area of GSM is similar to the routine area of packet-switched systems, zone and paging area of PDC and PHS, as well as UTRAN Registration Area of WCDMA. The concept of the network topology and connectivity of different network elements such as MSC, BSC, BTS and A-Interface in GSM system is similar to SGSN/GGSN in GPRS system, or RNC, Node-B and IuPS-Interface in WCDMA packet-switched system, WRT, ELU, Radio Network, Cell Station (CS) and WRT-ELU interface in PHS system. Therefore, the method disclosed in the embodiment of the present invention can be applied to other kinds of mobile communication networks as well.

Show Differences Between Plans:

With two or more MMO processes executed as mentioned above, the function "Show Differences" can be employed to display the differences between plans. The user should select two "different" plans and select a subject to compare: Cell, BSC, MSC, LA or RA. The "Show Differences" Result Dialog will display the differences, one item per line, depending on the comparison subject. Items are matched in the two plans by using their unique IDs, depending on the comparison subject. For Cells, the unique ID is the Cell Number. For MSCs, the MSC ID is used. For Location Areas, the LAC is used. For Routing Areas, the combination of the RAC and LAC gives the unique ID. The Statistics area will display the number of items that (a) appear only in the $1^{st}$ plan, (b) appear only in the $2^{nd}$ plan, (c) appear in both plans but differ in at least one of the properties displayed, or (d) appear in both plans and are identical. After the comparison results are shown, they may be printed or saved to a file.

Report Generator:

During the whole MMO process (FIG. 4), the invention provides several kinds of reports, which include reports for mobility analysis, reports for traffic, reports for mobility management loads, reports for LA/RA/BSC/MSC plan, reports for deployment plan, and chart-type report. Each report can be generated under different conditions.

Users can print out a certain report and save it into a disk. The reports will be saved in the format, the file path and name specified by the user and there is a standard header for all saved reports. It describes the plan it belongs to, the owner of the plan, its created date, its type, its duration and the number of records in it. Besides, users could publish a certain report through e-mail as well.

Erlang Calculator:

Erlang is used often in mobile communications for indicating traffic. "Erlang Calculator" is also provided in this invention. In accordance with the preferred embodiment of the present invention, Erlang is based on "Grade of Service (GOS)" value and the number of required channels to calculate.

Generating Network Deployment Plan and Implementation:
 (1) When the user has designed an optimal plan with a minimal load obtained from the preferred embodiment described. At this stage, a network deployment plan, which is a scheduling plan to reconstruct the network elements step by step, is generated and intended to find out the appropriate deployment date(s) and time(s). A deployment group includes the cells, which are usually geographically adjacent, to be deployed in the same period of time. The deployment groups are generated for the user automatically or the user may define the deployment groups manually.

Then, the deployment schedule (i.e. deployment date(s) and time(s)) of each deployment group will be arranged by evaluating the loading of the network. Usually the date(s) and time(s) of lowest loads in a week are chosen. The result will show the deployment date(s) and time(s) for each deployment group.

After generating the deployment plan successfully, the embodiment of the present invention can provide the user with different ways of handling the corresponding data. The deployment plan report may be directly displayed, exported to a printer, or saved into a storage medium. Another option is to send the deployment plan to the OMC directly at the deployment date(s) and time(s). If there are several deployment groups, the action of deployment will be executed several times following the deployment schedule of each deployment group.

Figure 10:
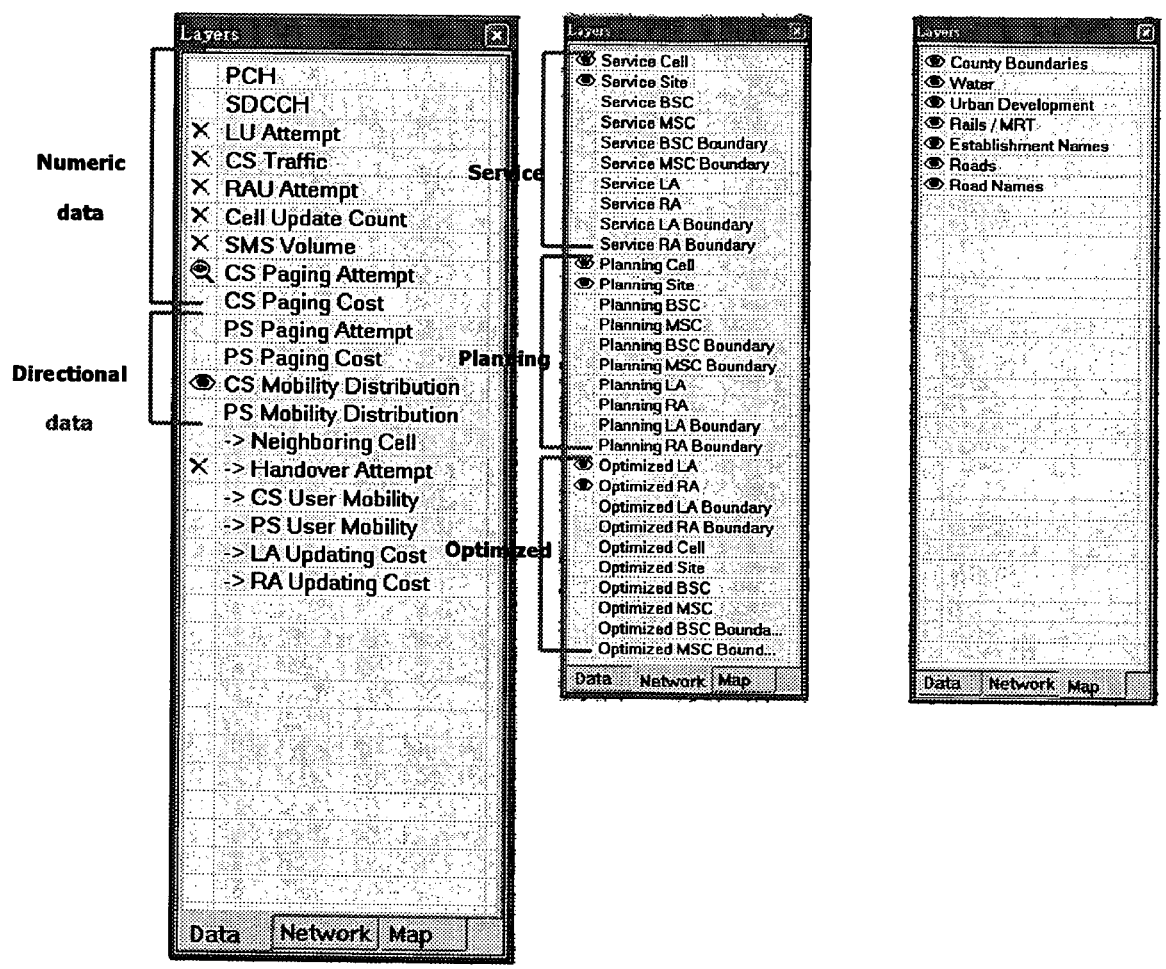
FIG. 10 illustrates the layer window of the application GUI window including respectively Data Layer, Network Layer and Map Layer, which can allow a user to select the desired layers for displaying.

The Relationship Between Map Window and Layer Window:

The layer window, displayed in the right pane of the application GUI window, uses layer to represent different data sets. FIG. 10 illustrates the layer window of the application GUI window including respectively Data Layer, Network Layer and Map Layer, which can allow a user to select the desired layers for displaying.

To display a layer item on the map window, the user can click the place ahead of the selectable items in the layer window. The symbol "👁" ahead of the item in the layer window (e.g., LA Attempt) indicates that the item is already visible on the map window. Besides, the symbol "✗" ahead of the item in the layer window (e.g., LA Attempt) indicates that the item is not available to display on map window. No symbol ahead of the item in the layer window indicates that the layer is available but chosen to be invisible on the map window now, and this item is selectable to be visible on the map window. In addition, the symbol of "→" indicates that the layer is a directional and is visible by clicking on the cells on map with "arrow" option activated. The selected items of the Data Layer, Network Layer and Map Layer are all displayed and overlapped on the map window with their respectively assigned symbols (e.g., dot, flag, etc.).

The network element layer and the associated traffic data layer can be selected and overlapped on the bottom layer to display, and make it easier to analyze the performance status of the network plan. In addition, the data layer can be filtered a portion to be displayed on the map window by setting value range. For example, if the user want to display only the top 20% cell distribution, then setting the value range for this criteria.

To sum up, the application GUI window of the embodiment of the proposed invention provides the user a friendly and convenient environment to optimize mobility management in a mobile communication network with at least one of the following features:

(1) Display of Digitalized Map: The user is allowed to import map data such as road, rivers along with longitude and latitude information. Functions are also provided to zoom in, zoom out, pan, or jump to a user-specified longitude/latitude and map scale directly.

(2) Display of NT: The invention shall be able to display the network elements such as MSC, BSC, site and cell. A tree type view shall be used to display the hierarchical relationship between the network elements. The map view shall be used to display the location of cells and associated information such as cell name, cell type, frequency band (900/1800 MHz) and direction of antenna. Search function shall be provided so that particular cell can be highlighted and centered on the map based on search parameter such as cell ID or cell name.

(3) Modification of NT: The user shall be able to manually add new site/cell or remove unused site/cell.

(4) Display of Location Area and Routing Area (LA/RA): The invention shall be able to visually display LA/RA. A tree type view shall be used to display the hierarchical information between MSC, LA, RA and cells. Different colored symbols shall be used in the map view for displaying different LAs/RAs. Colors can just be assigned by the user. Both original LA/RA and optimized LA/RA shall be displayed.

(5) Display of Optimized Network Plan: The invention shall be able to graphically show optimized cells, site, BSC and MSC.

(6) Display of Network Traffic Statistic Data: The application GUI window shall be able to display network statistic data including call rate (MTC/MOC), SMS, location update and directional handover in a graphical way. Data filtering function shall be provided so that the user can select to show only a subset of data, such as cells with the top 10% location update rate or cells with paging contribution rate above a certain number.

Embodiments within the scope of the embodiment of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

An exemplary system for implementing the invention includes a processor and a storage medium. The processor further includes a plurality of mechanisms for performing network planning and mobility management optimization (MMO) as follows:

a mechanism for importing the network topology;

a mechanism for collecting statistic data which include a plurality of user mobility behaviors and a plurality of traffic behaviors of network elements in the mobile communication network;

a mechanism for setting a network plan configurations through processing the imported network topology and the collected statistic data;

a mechanism for defining the network scope as an original network plan;

a mechanism for constructing the mobility model, wherein the mobility model represents the user mobility behaviors within the defined network scope;

a mechanism for optimizing mobility management to generate a new network plan; and a mechanism for comparing the new plan with the original plan for determining an optimal plan.

In addition, the mechanism for importing the network topology can further include a mechanism for preprocessing the network topology if needed. The mechanism for collecting network traffic statistic data can further include a mechanism for preprocessing the network statistic data if needed. The mechanism for constructing mobility model can further include a mechanism for obtaining a plurality of traffic loads as the preliminary result of the original plan. Furthermore, the processor can comprise a mechanism for generating a deployment plan according to the result of MMO. Each of the above-disclosed mechanisms can be implemented in the form of either a hardware circuit or a software program.

The storage medium coupling to the processor at least includes a plurality of databases for storing the data as follows: Network topology database (before and after preprocessing), Network traffic statistic database (before and after preprocessing), MMO plan data throughout the whole MMO process, Default or plan configurations database, Geographic map and their corresponding settings database, Network statistic data of the defined scope database, Mobility data after the mobility model generation, deployment plan database.

In this manner, the most important benefit of using the embodiment of the present invention is its capability to analyze statistics data collected from the network and generate new plans that improve network mobility traffic, balance network equipment loading, and reduce operational load. This capability simplifies the network planner's task of managing and improving control signals generated by subscriber mobility behaviors within a network. Furthermore, deploying the optimization plans generated by the present invention can help reduce signaling congestion, inter BSC/MSC handover failures, better network responsiveness, and a higher quality of service.

While the invention has been described by way of examples and in terms of the preferred embodiment, it is to be understood that the invention is not limited to the disclosed embodiment. On the contrary, it is intended to cover various modifications and similar arrangements or procedures, and the scope of the appended claims therefore should be accorded the broadest interpretation so as to encompass all such modifications and similar arrangements or procedures.

What is claimed is:

1. In a computer system, a method for performing a network planning of a mobile communication network comprising the steps of:
   importing a first data set into a memory of the computer system, wherein the first data set represents a network topology of the mobile communication network;
   collecting a second data set into the memory, wherein the second data set represents a plurality of statistic records, and the statistic records reflect a plurality of user mobility behaviors and a plurality of traffic behaviors of network elements in the mobile communication network;
   creating a first network plan through processing the first and the second data set by a processor of the computer system;
   displaying the first network plan through a graphic user interface (GUI) on a display device of the computer system;
   defining a planning scope representing a network area desired to be executed the network planning and mobility management optimization by the processor;
   setting a time period for a sample record from the second data set by the processor;
   processing the sample record by the processor;
   constructing a mobility model according to the processed sample record by the processor, wherein the mobility model represents the user mobility behaviors within the planning scope during the time period; and
   obtaining a plurality of traffic loads as a preliminary result of the first network plan by the processor.

2. The method according to claim 1, further comprising a step of preprocessing the first data set and the second data set to be in data file formats which are imported for performing the network planning.

3. The method according to claim 1, further comprising a step of determining a time-unit of the second data set such that the second data set is processed based on the determined time-unit.

4. The method according to claim 3, wherein the time-unit is determined to be at least one of a week, a day, an hour, a minute, and a user-defined time-unit.

5. The method according to claim 1, further comprising a step of generating a second network plan through performing a mobility management optimization (MMO) on the first network plan, wherein the MMO is performed through changing a plurality of parameters comprising at least one of the following items: a plurality of network scopes for registration area, a serving area of Mobile Switching Center (MSC), a serving area of Base Station Controller (BSC), a plurality of partitioning algorithms, a plurality of traffic load configurations, and a plurality of capacity constraint configurations.

6. The method according to claim 5, wherein the capacity constraint configurations further comprise at least one of the following items: the maximum number of a plurality of paging attempts per Location Area, the maximum number of cells per Routing Area, the maximum number of TRXs per BSC, the maximum number of TRXs per MSC, the maximum number of Erlang per BSC, and the maximum number of Erlang per MSC.

7. The method according to claim 5, further comprising a step of comparing the traffic loads of the second plan with those of the first plan for determining an optimal plan.

8. The method according to claim 7, further comprising a step of generating a deployment plan according to the result of mobility management optimization.

9. The method according to claim 1, wherein the traffic load configurations comprise voice, data and signaling traffic loads incurred in each of the network element and each of a plurality of links in a mobile communication network;
   wherein network elements comprise at least one of a Visitor Location Register (VLR), a Home Location Register (HLR), a MSC, a BSC, a Cell, a GPRS Support Node (SGSN), a Packet Process Unit (PAPU), a Packet Control Unit (PCU), a Radio Network Controller (RNC), and a Node-B; and wherein the links comprise at least of a A-interface, a A-bis, a Iu-R, and a Iu-B.

10. The method according to claim 1, wherein the step of displaying the network plan through the GUI further comprises displaying the first and the second data set as an associated map in a multi-layer format.

11. The method according to claim 10, wherein the associated map comprises at least one data layer represents a record of the second data set denoted by a symbol pattern.

12. The method according to claim 11, wherein the symbol pattern is located on network elements except the record of the second data set pertaining to a directional data, and the symbol pattern is located on the midpoint of two corresponding adjacent network elements on the map window if the record of the second data set pertains to a directional data.

13. The method according to claim 12, wherein the sum of the record value of two corresponding adjacent network elements is indicated by at least one of the size of the symbol pattern and the height of the symbol pattern if the record of the second data set pertain to a directional data.

14. The method according to claim 11, wherein the record value of the second data set is indicated by at least one of the size of the symbol pattern and the height of the symbol pattern.

15. The method according to claim 14, wherein the traffic variation is represented on the top of the symbol pattern and is denoted by different color to differentiate an increment or decrement if the record value of the second data set is indicated by the height of the symbol pattern, wherein the traffic variation indicates the value change of the record of the second data set between two time point.

16. The method according to claim 11, wherein the colors of the symbol patterns represent a plurality of different geographic location area code (LAC).

17. The method according to claim 1, wherein the associated map is displayed at least one of two-dimension (2D) and three-dimension (3D) representation.

18. A graphic user interface generated and controlled by a computer system to perform a network planning of a mobile communication network, comprising:
   a map window for use in displaying an associated map, which associates multi-layer information including geographic information, network elements and their statistic data within a network plan; and
   a tree pane for use in displaying a hierarchy of the network elements, which display a superior-subordinate relationship between the network elements within the network plan;
   wherein the hierarchy of the network elements of the network plan displayed on the tree pane is modified by using a mouse-type control device to select a network element and drag and drop it into a desired location of the tree pane, and then a new version of the superior-subordinate relationship between the network elements within the network plan is undated automatically.

19. The graphic user interface according to claim 18, further comprising a layer window for use in displaying a data layer, a network layer, and a map layer for controlling a plurality of graphic layers to be shown or hidden on the map window and filtering a portion of each graphic layer to be displayed on the map window by setting value range.

20. The graphic user interface according to claim 18, wherein the map window comprises providing information for analyzing a performance status of the network plan by overlapping layers.

21. The graphic user interface according to claim 18, wherein the map window further comprises a geographical graphic layer acting as a bottom layer to display the geographical features of the network scope of the mobile communication network.

22. The graphic user interface according to claim 18, wherein the associated map is displayed at least one of two-dimension (2D) and three-dimension (3D) representation.

23. The graphic user interface according to claim 22, wherein the associated map comprises at least one data layer represents one of the statistic data denoted by a symbol pattern.

24. The graphic user interface according to claim 23, wherein the symbol pattern is located on network elements except the statistic data pertaining to a directional data, and the symbol pattern is located on the midpoint of two corresponding adjacent network elements on the map window if the statistic data pertains to a directional data.

25. The graphic user interface according to claim 24, wherein the sum of the value of two corresponding adjacent network elements is indicated by at least one of the size of the symbol pattern and the height of the symbol pattern if the statistic data pertains to a directional data.

26. The graphic user interface according to claim 23, wherein the colors of the symbol patterns represent a plurality of different geographic location area code (LAC).

27. The graphic user interface according to claim 22, wherein the statistic data value is indicated by at least one of the size of the symbol pattern and the height of the symbol pattern.

28. The graphic user interface according to claim 27, wherein the traffic variation is represented on the top of the symbol pattern and is denoted by different color to differentiate an increment or decrement if the record value of the second data set is indicated by the height of the symbol pattern, wherein the traffic variation indicates the value change of the record of the second data set between two time point.

29. A system for implementing a network planning of a mobile communication network through a graphic user interface (GUI), the system comprising:
an input device to receive an input data, wherein the input data represents at least one of a network topology of the mobile communication network and a plurality of statistic records;
wherein the statistic records reflect a plurality of user mobility behaviors and a plurality of traffic behaviors of network elements in the mobile communication network;
a processor to process the input data for generating a network plan, wherein the network plan represents an arrangement of the network elements and the statistic records;
a storage medium to store the input data;
an operating system to control operation of the system; and
a display device to display the network plan, wherein the network plan is displayed in a graphic format through the graphic user interface;
wherein the processor comprises:
a mechanism for importing a first data set, wherein the first data set represents the network topology of the mobile communication network;
a mechanism for collecting a second data set, wherein the second data set represents the statistic records;
a mechanism for setting network plan configurations through processing the first data set and the second data set;
a mechanism for defining a network scope as an original network plan;
a mechanism for constructing a mobility model, wherein the mobility model represents the user mobility behaviors within the defined network scope; and
a mechanism for optimizing mobility management to generate a new network plan.

30. The system according to claim 29, wherein the input data further includes at least one input command and the processor is to process the input data according to the input command.

31. The system according to claim 30, wherein the input device receives the input command through the graphic user interface.

32. The system according to claim 29, wherein the processor further comprises a mechanism for preprocessing the first data set and the second data set to be in data file formats which are imported for performing the network planning.

33. The system according to claim 29, wherein the processor further comprises a mechanism for obtaining a plurality of traffic loads as a preliminary result of the original plan after the mobility model is constructed.

34. The system according to claim 33, wherein the processor further comprises a mechanism for generating a deployment plan according to the result of mobility management optimization.

35. The system according to claim 29, wherein the processor further comprises a mechanism for comparing the traffic loads of the new plan with those of the original plan for determining an optimal plan.

36. The system according to claim 29, wherein each mechanism of the processor further comprises at least a hardware device, at least a software program, or a combination of at least one hardware device and at least one software program.

37. The system according to claim 29, wherein the storage medium comprises at least one of a database to store the first data set, a database to store the second data set, a database to store the data generated through performing the mobility management optimization, a database to store plan configurations, a database to store a geographic map and the corresponding settings, a database to store the data generated through constructing the mobility model, and a database to store the deployment plan.

* * * * *